(12) United States Patent
Sako et al.

(10) Patent No.: US 6,215,750 B1
(45) Date of Patent: Apr. 10, 2001

(54) DATA RECORDING/REPRODUCING APPARATUS AND METHOD CORRESPONDING TO A PLURALITY OF DATA FORMATS, AND DATA RECORDING MEDIUM

(75) Inventors: Yoichiro Sako, Chiba; Tamotsu Yamagami, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/020,374

(22) Filed: Feb. 9, 1998

Related U.S. Application Data

(62) Division of application No. 08/648,489, filed on May 15, 1996.

(30) Foreign Application Priority Data

| May 31, 1995 | (JP) | P07-156784 |
|---|---|---|
| May 16, 1995 | (JP) | P07-141150 |
| Aug. 16, 1995 | (JP) | P07-230721 |
| Aug. 21, 1995 | (JP) | P07-234676 |

(51) Int. Cl.[7] .................................. G11B 7/00
(52) U.S. Cl. ................. 369/59; 369/58; 369/48; 369/50
(58) Field of Search ................. 369/59, 47, 48, 369/49, 50, 54, 58, 32; 360/48, 51, 53, 39

(56) References Cited

U.S. PATENT DOCUMENTS

| 5,060,221 | * | 10/1991 | Sako et al. ........................ 369/59 |
|---|---|---|---|
| 5,216,656 | * | 6/1993 | Sako et al. ........................ 369/59 |
| 5,297,125 | * | 3/1994 | Yamagami et al. ............ 369/44.13 |
| 5,327,406 | * | 7/1994 | Sako ................................ 369/32 |
| 5,455,814 | * | 10/1995 | Sako ................................ 369/59 |
| 5,469,416 | * | 11/1995 | Yamagami et al. ............... 369/48 |
| 5,497,367 | * | 3/1996 | Yamagami et al. ............ 369/275.2 |
| 5,506,623 | * | 4/1996 | Sako et al. ...................... 348/405 |
| 5,517,477 | * | 5/1996 | Sako ................................ 369/60 |
| 5,587,901 | * | 12/1996 | Yamagami et al. ............ 369/275.3 |
| 5,592,465 | * | 1/1997 | Yamagami et al. ............ 369/275.3 |
| 5,684,772 | * | 11/1997 | Yamagami et al. ............... 369/59 |
| 5,694,381 | * | 12/1997 | Sako ................................ 369/58 |
| 5,798,995 | * | 8/1998 | Fukushima et al. ............... 369/58 |
| 5,914,928 | * | 6/1999 | Takahashi ......................... 369/58 |

FOREIGN PATENT DOCUMENTS

| 0421871 A2 | * | 4/1991 | (EP) . |
|---|---|---|---|
| 0507341 A2 | * | 10/1992 | (EP) . |
| 2186401 | * | 8/1987 | (GB) . |
| 7-73593 | * | 3/1995 | (JP) . |

OTHER PUBLICATIONS

Patent Abstracts of Japan, JP 62–171324, Published Jul. 28, 1987, Sony Corporation.*
Patent Abstracts of Japan, JP 63–098876, Published Apr. 30, 1988, Sony Corporation.*
Patent Abstracts of Japan, JP 5–006625, Published Jan. 14, 1993, Sony Corporation.*
Patent Abstracts of Japan, JP 5–289819, Published Nov. 5, 1993, Sony Corporation.*

* cited by examiner

*Primary Examiner*—Muhammad Edun
(74) *Attorney, Agent, or Firm*—Limbach & Limbach LLP

(57) ABSTRACT

A data recording apparatus is constructed by: an input unit for receiving first and second digital data in which a ratio of sector sizes is not equal to an integer ratio; a block segmenting unit for inserting first data nA and second data mB (n and m are integers of 2 or more and n≠m) when it is assumed that a sector size of first data is set to A and a sector size of second data is set to B and for forming data of a block structure; a recording processing unit for performing an error correction encoding and a digital modulation to the data of the block structure; and a recording unit for recording the recording data from the recording processing unit to a data recording medium.

6 Claims, 26 Drawing Sheets

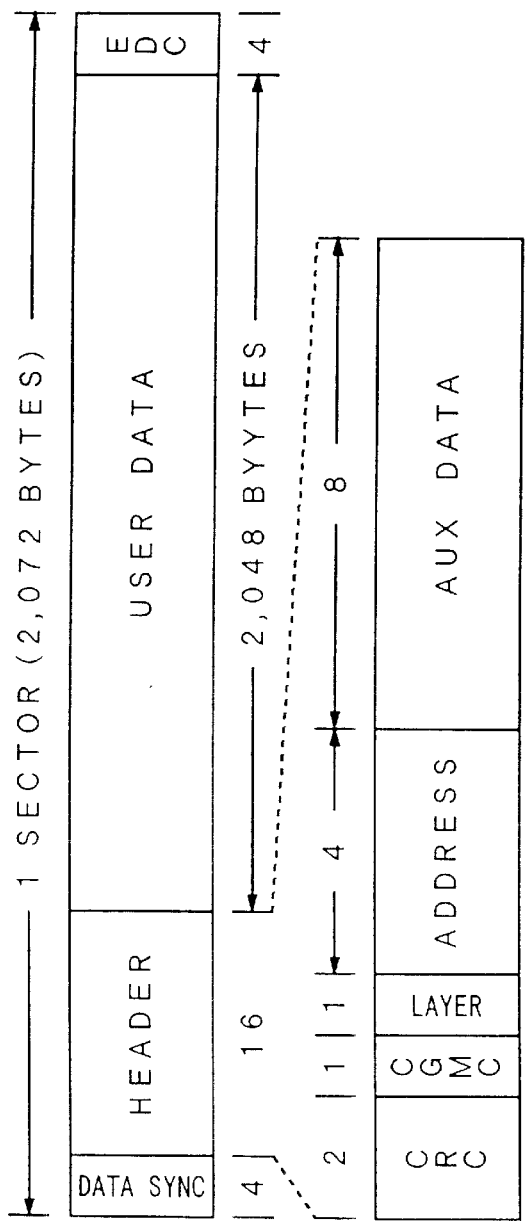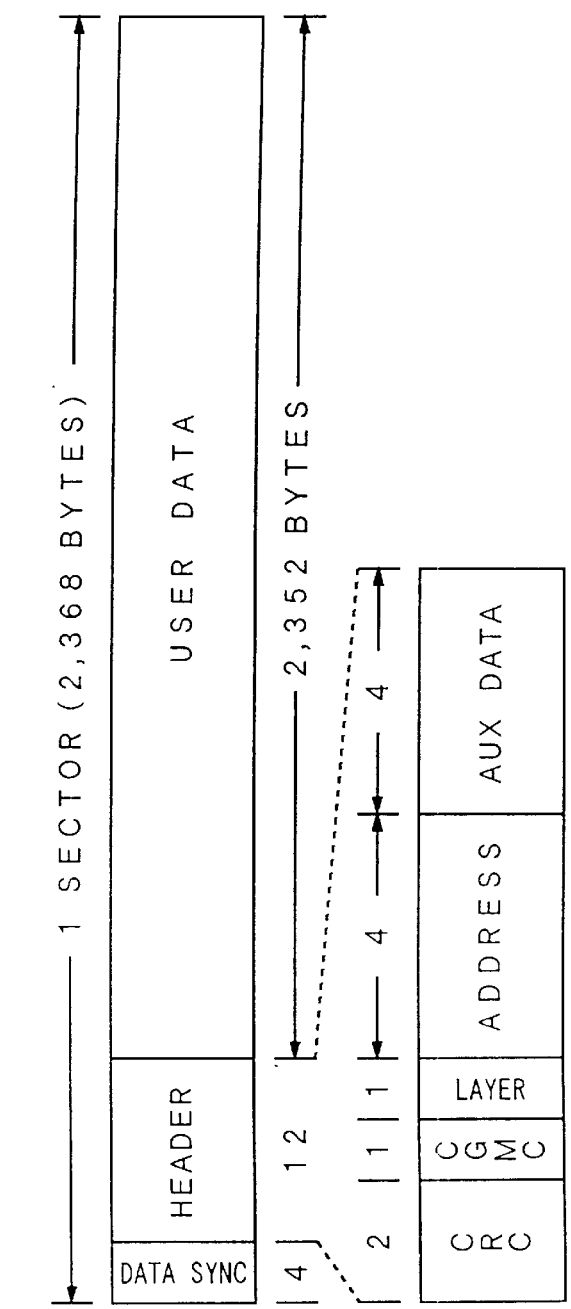
Fig. 9A  Fig. 9B  Fig. 10A  Fig. 10B

Fig. 19

| SYNC WORD | (8→16) MODULATION CODE WORD | | | |
|---|---|---|---|---|
| | 32 CHANNEL BITS | | 32 CHANNEL BITS | |
| | STATUSES 1 AND 2 | | STATUSES 3 AND 4 | |
| | MSB | LSB | MSB | LSB |
| S1 | 0001001001000000 | 0000000000000001 | 1001001001000000 | 0000000000000001 |
| S2 | 0001000001000000 | 0000000000000001 | 1001000001000000 | 0000000000000001 |
| S3 | 0000010001000000 | 0000000000000001 | 1000010001000000 | 0000000000000001 |
| S4 | 0000001001000000 | 0000000000000001 | 1000001001000000 | 0000000000000001 |
| S5 | 0000010000000001 | 0000000000000001 | 1000010000000001 | 0000000000000001 |

Fig. 20

DATA SYMBOLS

| | TABLE T1a | S | TABLE T2a | S | TABLE T3a | S | TABLE T4a | S |
|---|---|---|---|---|---|---|---|---|
| 0 | 0010000000001001 | 1 | 0100000100100000 | 2 | 0010000000001001 | 1 | 0100000100100000 | 2 |
| 1 | 0010000000010010 | 1 | 0010000000010010 | 1 | 1000000100100000 | 3 | 1000000100100000 | 3 |
| 2 | 0010000100100000 | 2 | 0010000100100000 | 2 | 1000000000010010 | 1 | 1000000000010010 | 1 |
| 3 | 0010000001001000 | 2 | 0100010010000000 | 4 | 0010000001001000 | 2 | 0100010010000000 | 4 |
| 4 | 0010000010010000 | 2 | 0010000010010000 | 2 | 1000000100100000 | 2 | 1000000100100000 | 2 |
| 5 | 0010000000100100 | 2 | 0010000000100100 | 2 | 1001001000000000 | 4 | 1001001000000000 | 4 |
| 6 | 0010000000100100 | 3 | 0010000000100100 | 3 | 1000100100000000 | 4 | 1000100100000000 | 4 |
| 7 | 0010000010001000 | 3 | 0100000000010010 | 1 | 0010000001001000 | 3 | 0100000000010010 | 1 |
| 8 | 0010000010010000 | 3 | 0010000010010000 | 3 | 1000010010000000 | 4 | 1000010010000000 | 4 |
| 9 | 0010000100100000 | 3 | 0010000100100000 | 3 | 1001001000000001 | 1 | 1001001000000001 | 1 |
| 10 | 0010010010000000 | 4 | 0010010010000000 | 4 | 1000100100000001 | 1 | 1000100100000001 | 1 |
| 11 | 0010001001000000 | 4 | 0010001001000000 | 4 | 1000000010010000 | 3 | 1000000010010000 | 3 |
| 12 | 0010010010000001 | 1 | 0010010010000001 | 1 | 1000000010010000 | 2 | 1000000010010000 | 2 |
| 13 | 0010001001000001 | 1 | 0010001001000001 | 1 | 1000010010000001 | 1 | 1000010010000001 | 1 |
| 14 | 0010000001001001 | 1 | 0100000000100100 | 3 | 0010000001001001 | 1 | 0100000000100100 | 3 |
| 15 | 0010000100100001 | 1 | 0010000100100001 | 1 | 1000001001000001 | 1 | 1000001001000001 | 1 |
| 16 | 0010000010010001 | 1 | 0010000010010001 | 1 | 1000000100100001 | 1 | 1000000100100001 | 1 |
| 17 | 0010000000100010 | 1 | 0010000000100010 | 1 | 1000001001000000 | 4 | 1000001001000000 | 4 |
| 18 | 0001000000001001 | 1 | 0100000010010000 | 2 | 0001000000001001 | 1 | 0100000010010000 | 2 |
| 19 | 0010000000010001 | 1 | 0010000000010001 | 1 | 1001000100000000 | 4 | 1001000100000000 | 4 |
| 20 | 0001000000010010 | 1 | 0001000000010010 | 1 | 1000100010000000 | 4 | 1000100010000000 | 4 |
| ⋮ | ⋮ | | ⋮ | | ⋮ | | ⋮ | |
| 248 | 0000100100001001 | 1 | 0100010010010001 | 1 | 0000100100001001 | 1 | 0100010010010001 | 1 |
| 249 | 0000100001000001 | 1 | 0000100001000001 | 1 | 1000010000001001 | 1 | 1000010000001001 | 1 |
| 250 | 0000010010010010 | 1 | 0000010010010010 | 1 | 1000001000000010 | 1 | 1000001000000010 | 1 |
| 251 | 0000010001000010 | 1 | 0000010001000010 | 1 | 1000000100000001 | 1 | 1000000100000001 | 1 |
| 252 | 0000100010001001 | 1 | 0100010000100010 | 1 | 0000010010001001 | 1 | 0100010000100010 | 1 |
| 253 | 0000010000100001 | 1 | 0000010000100001 | 1 | 0100100010011001 | 1 | 0100100010011001 | 1 |
| 254 | 0000001001000100 | 2 | 0100010000010001 | 1 | 1001000000010000 | 2 | 0100010000010001 | 1 |
| 255 | 0000001000001000 | 2 | 0100001000010010 | 1 | 1000100100010000 | 2 | 0100001000010010 | 1 |

DATA SYMBOLS

| | TABLE T1b | S | TABLE T2b | S | TABLE T3b | S | TABLE T4b | S |
|---|---|---|---|---|---|---|---|---|
| 0 | 0000010010000000 | 4 | 0000010010000000 | 4 | 0100100001001000 | 2 | 0100100001001000 | 2 |
| 1 | 0000100100000000 | 4 | 0000100100000000 | 4 | 0100100001001000 | 3 | 0100100001001000 | 3 |
| 2 | 0001001000000000 | 4 | 0001001000000000 | 4 | 0100100000001001 | 1 | 0100100000001001 | 1 |
| 3 | 0000001001000000 | 4 | 0100010000000001 | 1 | 1000001000000000 | 4 | 0100010000000001 | 1 |
| 4 | 0000000100100000 | 3 | 0100100000000010 | 1 | 1001000000000100 | 3 | 0100100000000010 | 1 |
| 5 | 0000000010010000 | 3 | 0100001000000000 | 4 | 1001000000100100 | 3 | 0100001000000000 | 4 |
| 6 | 0000000001001000 | 3 | 0100100000000100 | 2 | 1001000001001000 | 3 | 0100100000000100 | 2 |
| 7 | 0000000001001000 | 2 | 0100000100000000 | 4 | 1001000000000100 | 2 | 0100000100000000 | 4 |
| 8 | 0000000010010000 | 2 | 0100100010010000 | 3 | 1001000000100100 | 2 | 0100100010010000 | 3 |
| 9 | 0000000100100000 | 2 | 0100100000100100 | 2 | 1001000001001000 | 2 | 0100100000100100 | 2 |
| 10 | 0000010001000000 | 4 | 0000010001000000 | 4 | 1001001001000000 | 4 | 1001001001000000 | 4 |
| ⋮ | ⋮ | | ⋮ | | ⋮ | | ⋮ | |
| 84 | 0010010000100100 | 2 | 0010010000100100 | 2 | 1000100000001000 | 2 | 1000100000001000 | 2 |
| 85 | 0010010010010000 | 2 | 0010010010010000 | 2 | 0100010001001001 | 1 | 0100010001001001 | 1 |
| 86 | 0000100000100100 | 2 | 0100001000100100 | 2 | 1000100001000100 | 2 | 0100001000100100 | 2 |
| 87 | 0000000100100100 | 2 | 0100010001000100 | 2 | 1000100010001000 | 2 | 0100010001000100 | 2 |

FLOWCHART SHOWING AN EXAMPLE OF CONVERSION TABLE CONSTRUCTION ALGORITHM

Fig. 22

| CODE WORDS | CAHNGE AMOUNT OF DSV WHEN CWLL = L | DATA SYMBOLS TO BE ALLOCATED | | |
|---|---|---|---|---|
| 0010010010000000 | +6 | 0 | ⎫ 88 CODE WORDS | ⎫ |
| 0010001001000000 | +6 | 1 | | |
| 0010000100100000 | +6 | 2 | | |
| 0010000010010000 | +6 | 3 | | |
| : | : | : | | |
| : | : | : | | TABLE T1a |
| 0000100000100100 | +2 | 87 | ⎭ | |
| 0000100000000100 | +2 | 88 | ⎫ | |
| 0000100000010010 | +2 | 89 | | |
| 0010010010010010 | 0 | 90 | 168 CODE WORDS | |
| : | : | : | | |
| : | : | : | | |
| 0000010010010001 | −2 | 255 | ⎭ | ⎭ |
| 0000100000010000 | −2 | 87 | ⎫ | ⎫ |
| 0000010000010001 | −2 | 86 | | |
| 0010010010010000 | −4 | 85 | 88 CODE WORDS | TABLE T1b |
| : | : | : | | |
| : | : | : | | |
| 0000100100000000 | −10 | 1 | | |
| 0000010010000000 | −10 | 0 | ⎭ | ⎭ |

DIAGRAM SHOWING UNIT TABLE T1 WHEN STATUS VALUE IS SET TO 1

Fig. 23

| CODE WORDS | CAHNGE AMOUNT OF DSV WHEN CWLL = L | DATA SYMBOLS TO BE ALLOCATED | | |
|---|---|---|---|---|
| 0100100100000000 | +8 | 0 | ⎤ 88 CODE WORDS | ⎤ TABLE T2a |
| 0100010010000000 | +8 | 1 | | |
| 0100001001000000 | +8 | 2 | | |
| 0100000100100000 | +8 | 3 | | |
| : | : | : | | |
| : | : | : | | |
| 0100000100000100 | +2 | 87 | ⎦ | |
| 0100000100000100 | +2 | NOT USED | | |
| 0100000001000001 | +2 | 88 | ⎤ 168 CODE WORDS | |
| 0100000000100000 | +2 | 89 | | |
| 0010010010000010 | +2 | 90 | | |
| : | : | : | | |
| : | : | : | | |
| 0000010000100010 | −2 | 255 | ⎦ | ⎦ |
| 0000010000010001 | −2 | NOT USED | | |
| 0100100100100000 | −4 | 87 | ⎤ 88 CODE WORDS | ⎤ TABLE T2b |
| 0100100010010000 | −4 | 86 | | |
| 0100100000100100 | −4 | 85 | | |
| : | : | : | | |
| : | : | : | | |
| 0000100100000000 | −10 | 1 | | |
| 0000010010000000 | −10 | 0 | ⎦ | ⎦ |

DIAGRAM SHOWING UNIT TABLE T2 WHEN STATUS VALUE IS SET TO 2

Fig. 24

| CODE WORDS | CAHNGE AMOUNT OF DSV WHEN CWLL = L | DATA SYMBOLS TO BE ALLOCATED | | |
|---|---|---|---|---|
| 1001001000000000 | +10 | 0 | ⎫ | ⎫ |
| 1000100100000000 | +10 | 1 | | |
| 1000010010000000 | +10 | 2 | 88 CODE WORDS | |
| 1000001001000000 | +10 | 3 | | |
| : | : | : | | TABLE T3a |
| : | : | : | | |
| 1000000000100000 | +4 | 87 | ⎭ | |
| 0100000100001000 | +4 | 88 | ⎫ | |
| 0100000010001001 | +4 | 89 | | |
| 0010000010001000 | +4 | 90 | 168 CODE WORDS | |
| : | : | : | | |
| : | : | : | | |
| 1001000000010001 | −2 | 255 | ⎭ | ⎭ |
| 1001000000001000 | −2 | 87 | ⎫ | ⎫ |
| 1000100100100000 | −2 | 86 | | |
| 1000100010010000 | −2 | 85 | 88 CODE WORDS | TABLE T3b |
| : | : | : | | |
| : | : | : | | |
| 0000100100001001 | −4 | 1 | | |
| 0000010010001001 | −4 | 0 | ⎭ | ⎭ |

DIAGRAM SHOWING UNIT TABLE T3 WHEN STATUS VALUE IS SET TO 3

Fig. 25

| CODE WORDS | CAHNGE AMOUNT OF DSV WHEN CWLL = L | DATA SYMBOLS TO BE ALLOCATED | | |
|---|---|---|---|---|
| 1001001000000000 | +10 | 0 | ⎫ 88 CODE WORDS | ⎫ TABLE T4a |
| 1000100100000000 | +10 | 1 | | |
| 1000010010000000 | +10 | 2 | | |
| 1000001001000000 | +10 | 3 | | |
| ⋮ | ⋮ | ⋮ | | |
| 1000010010010010 | +4 | 87 | ⎭ | |
| 1000010010001001 | +4 | NOT USED | | |
| 1000010010000100 | +4 | 88 | ⎫ 168 CODE WORDS | |
| 1000010001000010 | +4 | 89 | | |
| 1000010000100001 | +4 | 90 | | |
| ⋮ | ⋮ | ⋮ | | |
| 0100000001000000 | 0 | 255 | ⎭ | ⎭ |
| 1001001001000001 | −2 | NOT USED | | |
| 1001001000100000 | −2 | 87 | ⎫ 88 CODE WORDS | ⎫ TABLE T4b |
| 1001000100100001 | −2 | 86 | | |
| 1001000100010000 | −2 | 85 | | |
| ⋮ | ⋮ | ⋮ | | |
| 0100010000000001 | −6 | 0 | | |
| 0100001000000000 | −6 | 1 | ⎭ | ⎭ |

DIAGRAM SHOWING UNIT TABLE T4 WHEN STATUS VALUE IS SET TO 4

FLOWCHART SHOWING AN EXAMPLE OF ALGORITHM OF MODULATION

DATA RECORDING/REPRODUCING APPARATUS AND METHOD CORRESPONDING TO A PLURALITY OF DATA FORMATS, AND DATA RECORDING MEDIUM

This application is a division of application Ser. No. 08/648,489, filed May 15, 1996.

BACKGROUND OF THE INVENTION

1. Field of the Invention

The invention relates to data recording/reproducing apparatus and method corresponding to a plurality of data formats and a data recording medium.

2. Description of the Prior Art

As an external memory apparatus of a computer, attention is paid to an optical disc drive from a viewpoint of advantages of a large capacity and a high-speed access. The use of a CD-ROM [or CD-I (CD Interactive)] drive and an MO (magneto-optical disc serving as one of erasable discs) drive has already rapidly been being spread. In addition to those discs, an MD (mini disc; erasable disc) having a disc diameter of 2.5 inches has also been proposed. Further, a DVD (digital video disc) is being developed as a video memory medium.

The DVD is a read only disc having the same diameter as that of the CD or a recordable/reproducible optical disc such as MO disc or phase-change type disc. The DVD is a disc in which video information compressed by an MPEG or the like can be reproduced or can be recorded and reproduced. In the DVD, by the improvement of processes such as digital modulation and error correction encoding in association with the progress of the realization of a short wavelength of a laser beam and an increase in numerical aperture NA of an objective lens, a recording density is further raised. Even in case of a single-layer disc, a data memory capacity is very large to be about 3.7 Gbytes. In a manner similar to the CD and MD which have first been developed as digital audio discs and, after that, they are also used as external memory media of computers, it is expected that the DVD having a larger capacity is used as an external memory medium of the computer.

Hitherto, since different formats have been specified for every medium such as magnetic tape, magnetic disc, flexible disc, above-mentioned optical discs, and the like, respectively, a consideration about a compatibility is not made. Therefore, in case of obtaining a compatibility between a new medium and the existing medium, such a compatibility can correspond in only a logical region, so that it is not efficient. For example, in case of an external memory medium of a computer, a sector size of (128 bytes×$2^i$)(512 bytes, 2 kbytes, or the like) is a main stream. In the CD-ROM, 2352 bytes (in case of excluding a synch signal, 2340 bytes; in case of excluding the synch signal and a header, 2336 bytes) is set to one block. Thus, there is a problem such that it is difficult for both of them to physically correspond to each other. Further, as a sector size according to the CD format including the CD-ROM, when considering a sub-code as well, there are other various sizes.

The above-mentioned DVD can be realized even by a recordable MO disc or a phase-change type disc, so that there is an advantage such that when comparing with a capacity of any one of the other existing optical discs, a capacity of the DVD is remarkably large. In case of newly using such a DVD as an external memory medium, it is indispensable to consider the compatibility with the existing optical disc media, especially, the CD-ROM which has been widespread and has almost the same disc size and uses the same reading method in order to simplify the mutual transmission and reception of data between the CD-ROM and the DVD, to enable the drive to be shared, and further, to effectively use the resources of the CD-ROM.

In JP-A-7-73593, the inventors et al. of the present invention have proposed the method of setting a memory capacity per one recording block unit of the MO disc to 2352 bytes in order to simplify the data transmission and reception between the CD-ROM and the MO disc. According to the method, the memory capacity per one recording block of the MO disc is matched with that of the CD-ROM. There is a problem such that although such a method can be applied to a case where a data structure of the disc is newly decided, it cannot be applied to a case where the data structure of the disc has been standardized to a certain degree.

As mentioned above, in the data recording/reproducing apparatus in which a plurality of sector sizes are permitted, ordinarily, a different format is specified every data having a different sector size and signal processes for recording and reproduction are made independent every format. According to such a method, there is a problem that a scale of a hardware for recording and reproduction increases. As another method, there is a method whereby data having different sector sizes is fundamentally recorded and reproduced in the same format, an identification (ID) signal is inserted to a directory area or a header area as additional information, and the sector size is recognized by the ID signal.

The method of inserting the ID information of a sector size into the additional information has an advantage such that a hardware can be partially shared. However, there is a problem with respect to a point of an accessing performance. Generally, in case of recording and reproducing digital data, a digital modulation such as an EFM or the like is generally performed to data in order to improve an error rate and to enable a clock to be easily extracted. The additional information as mentioned above has been also modulated. Therefore, the ID information cannot be obtained upon reproduction unless a process for demodulation is finished. A sector size of data which was reproduced so far cannot be known, so that the accessing performance deteriorates.

OBJECTS AND SUMMARY OF THE INVENTION

It is, therefore, an object of the invention to provide data recording/reproducing apparatus and method and data recording medium which can smoothly perform a data compatibility between two or more different data structures, more particularly, two or more data structures having different sector sizes.

Another object of the invention is to provide data recording/reproducing apparatus and method and data recording medium which enables a sector of a size according to a CD format to be easily packed to a predetermined block, thereby enabling data according to the CD format to be easily transferred.

Further another object of the invention is to provide data recording/reproducing apparatus and method and disc medium in which when two or more data structures having different predetermined units of data such as a sector size or the like are enabled to be processed, a scale of a hardware is small and a good accessing performance can be obtained.

To accomplish the above objects, according to the invention, there is provided a data recording apparatus for recording digital data to a recordable optical disc, comprising: input means for receiving at least two digital data in which a ratio between sector sizes is not an integer ratio; means for inserting data nA and data mB (n and m are integers of 2 or more and n ≠m) into a block of a predetermined size when it is assumed that a sector size of first data is set to A and a sector size of second data is set to B, thereby forming data of a block structure; recording processing means for executing an error correction encoding and a digital modulation for the data of the block structure; and recording means for recording the recording data from the recording processing means to the optical disc. According to the invention, there is also provided a recording method of recording data as mentioned above.

According to the invention, there is provided a data reproducing apparatus for reproducing an optical disc in which digital data of a block structure of sizes in which a ratio between a sector size A of first data and a sector size B of second data is not an integer ratio and data nA and mB (n and m are integers of two or more and n≠m) can be inserted has been recorded, comprising: means for reproducing the digital data; reproduction processing means for performing a digital demodulation and an error correction to the data of the block structure; means for dividing the data of the block structure from the reproduction processing means into sectors and for outputting the data of a sector structure; and means for transmitting the data of the sector structure. According to the invention, there is also provided a reproducing method of reproducing data as mentioned above.

According to the invention, further, there is provided a disc medium in which digital data of a block structure in which when it is assumed that a sector size of first data is set to A and a sector size of second data is set to B in which a ratio of sizes is not an integer ratio, at least two data of nA and mB (n and m are integers of two or more and n≠m) can be inserted has been recorded.

According to the invention, two formats in which sector sizes are different and a ratio of the sector sizes is not an integer ratio can be united to a block structure having the same size. For example, the data read out from the existing CD-ROM can be simply recorded to a DVD.

The above and other objects and features of the present invention will become apparent from the following detailed description and the appended claims with reference to the accompanying drawings.

BRIEF DESCRIPTION OF THE DRAWINGS

FIGS. 9A and 9B are schematic diagrams each showing an example of a data structure of a sector of 2 kbytes in an embodiment of the invention;

FIGS. 10A and 10B are schematic diagrams each showing an example of a data structure of a CD sector in an embodiment of the invention;

FIG. 19 is a schematic diagram showing a specific example of the sync to be added;

FIG. 20 is a schematic diagram showing an example of a conversion table of an (8–16) modulation as one of digital modulating methods which can be used in the invention;

FIG. 22 is a schematic diagram showing an example of a unit table when a status value is set to "1";

FIG. 23 is a schematic diagram showing an example of the unit table when the status value is set to "2";

FIG. 24 is a schematic diagram showing an example of the unit table when the status value is set FIG. 25 is a schematic diagram showing an example of the unit table when the status value is set to "14";

DETAILED DESCRIPTION OF THE PREFERRED EMBODIMENTS

The first embodiment of the invention will now be described hereinbelow with reference to the drawings. FIG.

1 shows a recording/reproducing system for an optical disc according to the invention. According to the first embodiment, the system has: a host computer 1; a CD-ROM drive (optical disc drive) 2 connected to the host computer 1; and a drive of a high-density optical disc 3. The high-density optical disc 3 denotes a recordable/reproducible optical disc of a large capacity in which a recording density is higher than that of a CD or a CD-ROM which has already been put into practical use. A DVD (disc of the magneto-optical type or phase-change type) which has been proposed at present is one of such discs. The realization of a high density can be accomplished by a short wavelength of a laser, an increase in numerical aperture NA of an objective lens, an improvement of a digital modulation (for example, a digital modulation which can omit a connecting bit in an EFM), or the like. The optical disc drive has a construction after an interface 4.

Figure 1:
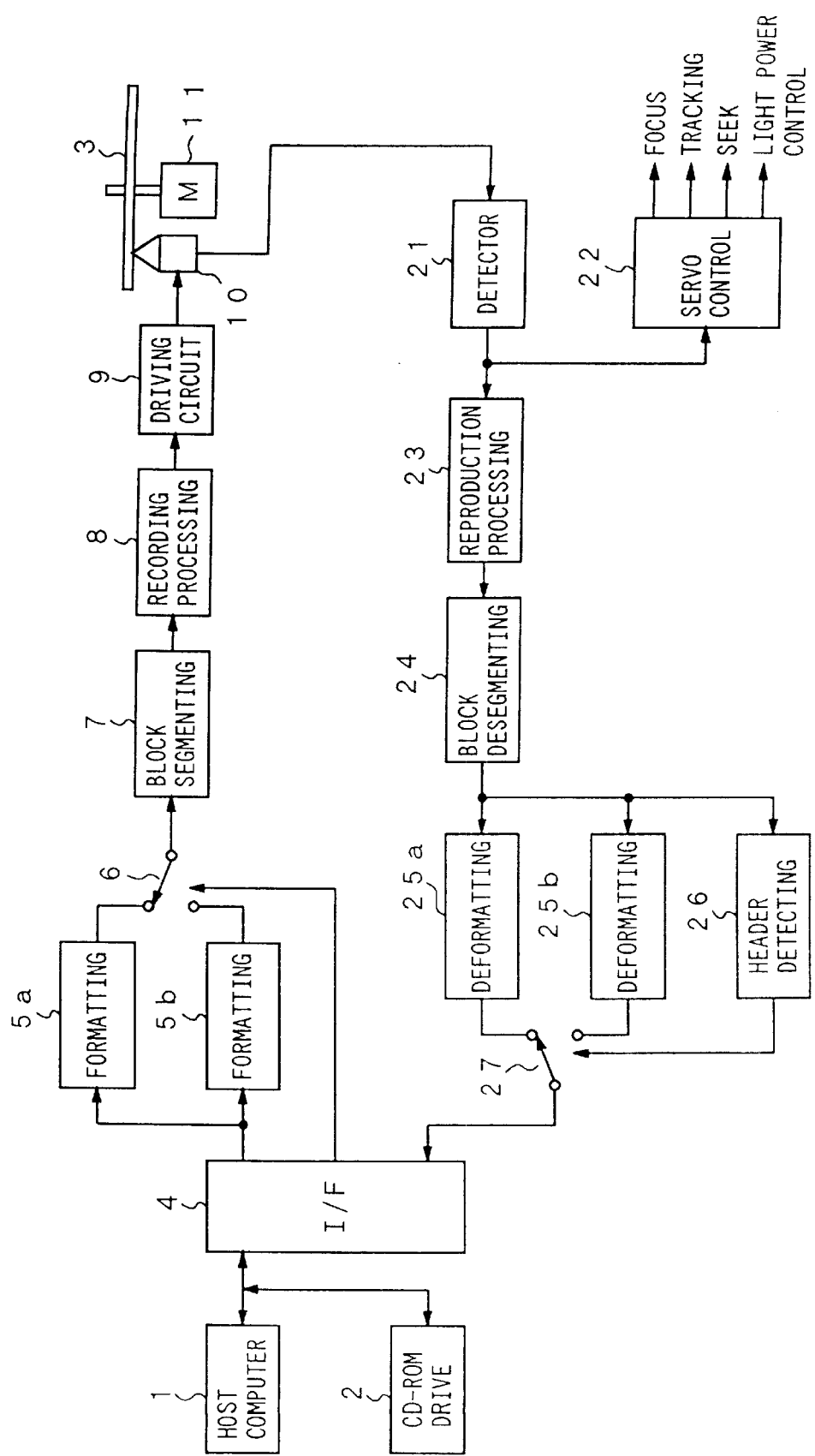
FIG. 1 is a block diagram of the first embodiment of a recording/reproducing circuit according to the invention.

The invention is not limited to the construction such that the CD-ROM drive 2 and high-density optical disc drive 3 are formed by the different hardwares as shown in the example in FIG. 1. The disc control unit such as rotation of the disc, optical pickup, thread mechanism of the optical pickup, servo system, etc. and the like can be shared and a drive as a hardware can be also commonly used.

According to the embodiment, the recording data from the host computer 1 is recorded onto the optical disc 3 via the interface 4. The data read out from the optical disc 3 is supplied to the host computer 1 through the interface 4. The recording data is video data which was compressed, audio data which was compressed, data for a computer, or the like. A recordable type (magneto-optical type or phase-change type disc) of the DVD which has been proposed at present is an example of the optical disc 3. The recording system in FIG. 1 can be applied to not only the recordable optical disc 3 but also a mastering system of a read only disc.

Figure 6:
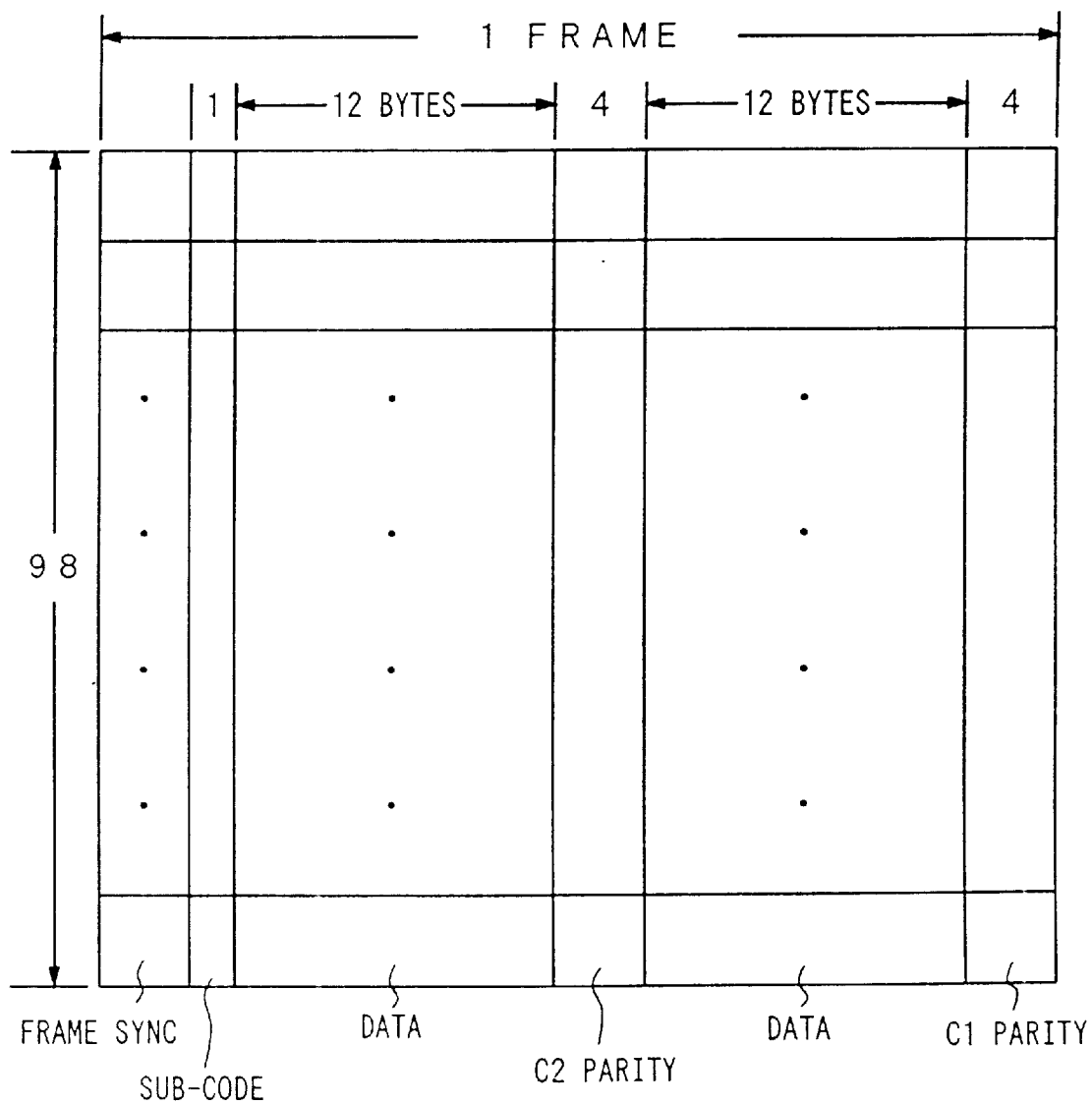
FIG. 6 is a schematic diagram for explaining a data structure of a conventional CD.

The data structure of the optical disc 3 to which the invention can be applied, in particular, a data unit for accessing (recording or reproduction) will now be described. First, a sector structure of CD-ROM data will now be explained. The CD-ROM is a disc developed from the well-known CD. In the CD, as shown in FIG. 6, a sub-code of one byte, data of 24 bytes, and C1 and C2 parities each consisting of four bytes are arranged in a transmission frame (also referred to as an EFM frame or C1 frame). On the CD, each byte is converted to a code word of 14 channel bits by an EFM modulation and is recorded through connection bits (three channel bits). Further, a sync which denotes a synchronous signal of total 24 channel bits in which an inversion interval of 11T (T denotes a period of a channel bit) continues and two channel bits are added after that is added to the head of the transmission frame.

The sub-code is constructed so that one unit is composed of 98 transmission frames as a period. Therefore, in the CD, user data of 24 bytes×98=2,352 bytes is included in the 98 transmission frames. A sector constructing by using 98 transmission frames as a unit is called a CD sector. When up to the sub-code is included, the CD sector is composed of 25 bytes×98=2,450 bytes Since the sub-codes of the first and second frames are sync patterns, when such two bytes are excluded, the CD sector is composed of 2,448 bytes. Further, the sub-codes exist in eight channels P, Q, R, S, T, U, V, and W. In the case where only the sub-code of one channel, for example, the Q channel among those channels is included in the sector, (2,352+12=) 2,352 bytes are set to a sector size. As mentioned above, there are four kinds of sector sizes of 2,352 bytes, 2,450 bytes, 2,448 bytes, and 2,364 bytes in the format of the CD.

Figure 7:
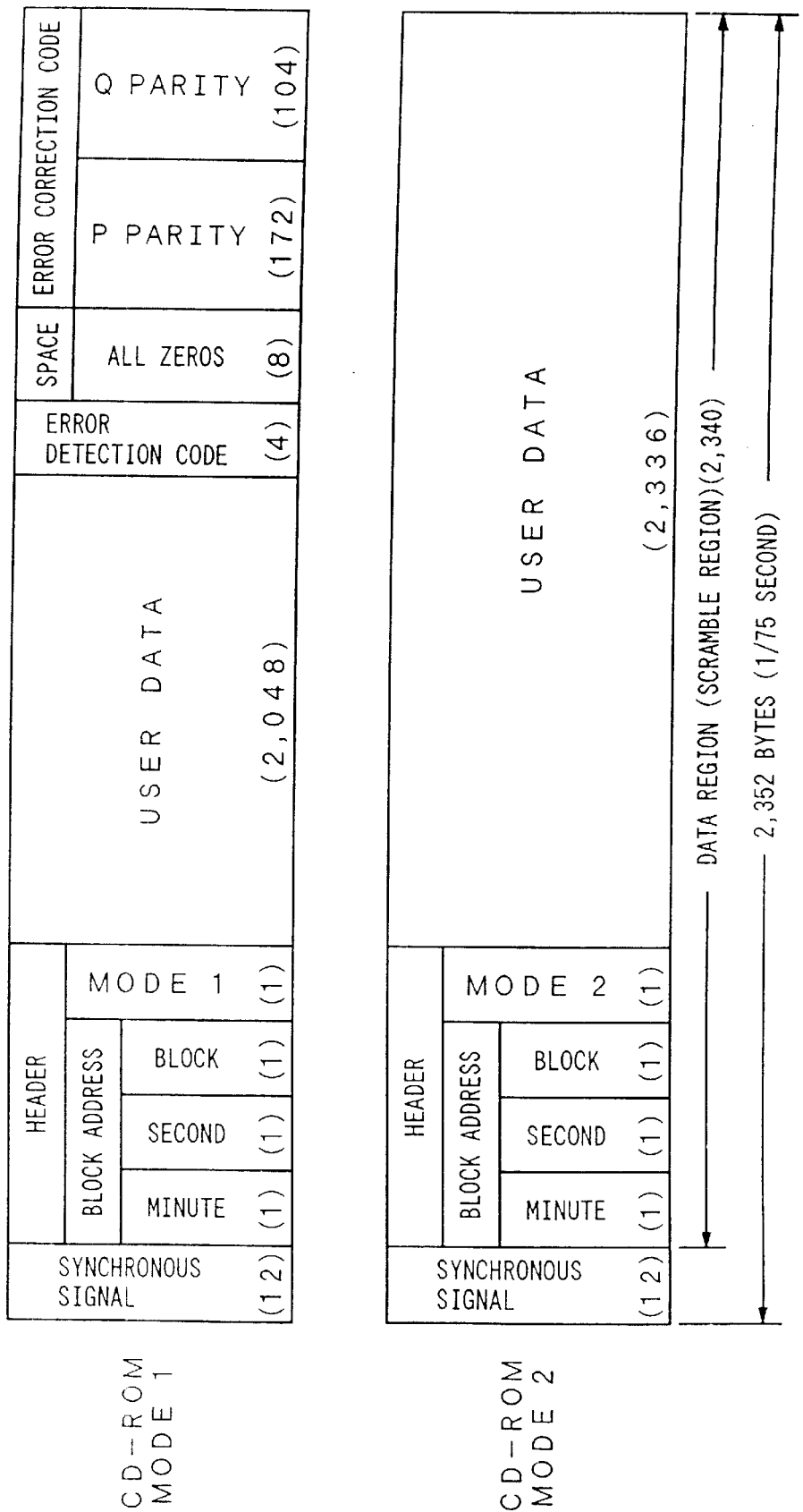
FIG. 7 is a schematic diagram for explaining a data structure of a conventional CD-ROM.

The data structure of the CD-ROM is specified on the basis of the transmission format of the CD. Namely, in the CD-ROM, 2,352 bytes as data included in 98 frames of a period of the sub-code are set to an access unit. Although such an access unit is also referred to as a block, it will be called a sector in the following description. FIG. 7 shows a data structure of one sector of the CD-ROM.

In the CD-ROM, mode 0, mode 1, and mode 2 have been specified. In those modes, a sync (12 bytes) indicative of a delimiter of the sectors and a header (4 bytes) are commonly added. The mode 0 relates to the data in which all of the data other than the sync and header is equal to "0" and is used as dummy data. FIG. 7 shows the data structures of one sector of the mode 1 and mode 2. The header is composed of address information of three bytes and mode information of one bytes similar to those in the sub-code of the CD.

In the data structure of mode 1, the user data is composed of 2,048 bytes (2 kbytes) and redundancy data of 288 bytes is added to the user data in order to raise an error correcting ability. That is, an error detection code (4 bytes), a space (corresponding to 8 bytes), a P parity (172 bytes), and a Q parity (104 bytes) are added as auxiliary data. Mode 1 is suitable for recording data such as character code, computer data, or the like in which a high reliability is required. In mode 2, auxiliary data of 288 bytes is not added, so that the user data of 2,336 bytes can be recorded. Mode 2 is suitable for recording data such as video data or audio data in which errors can be interpolated.

Figure 8:
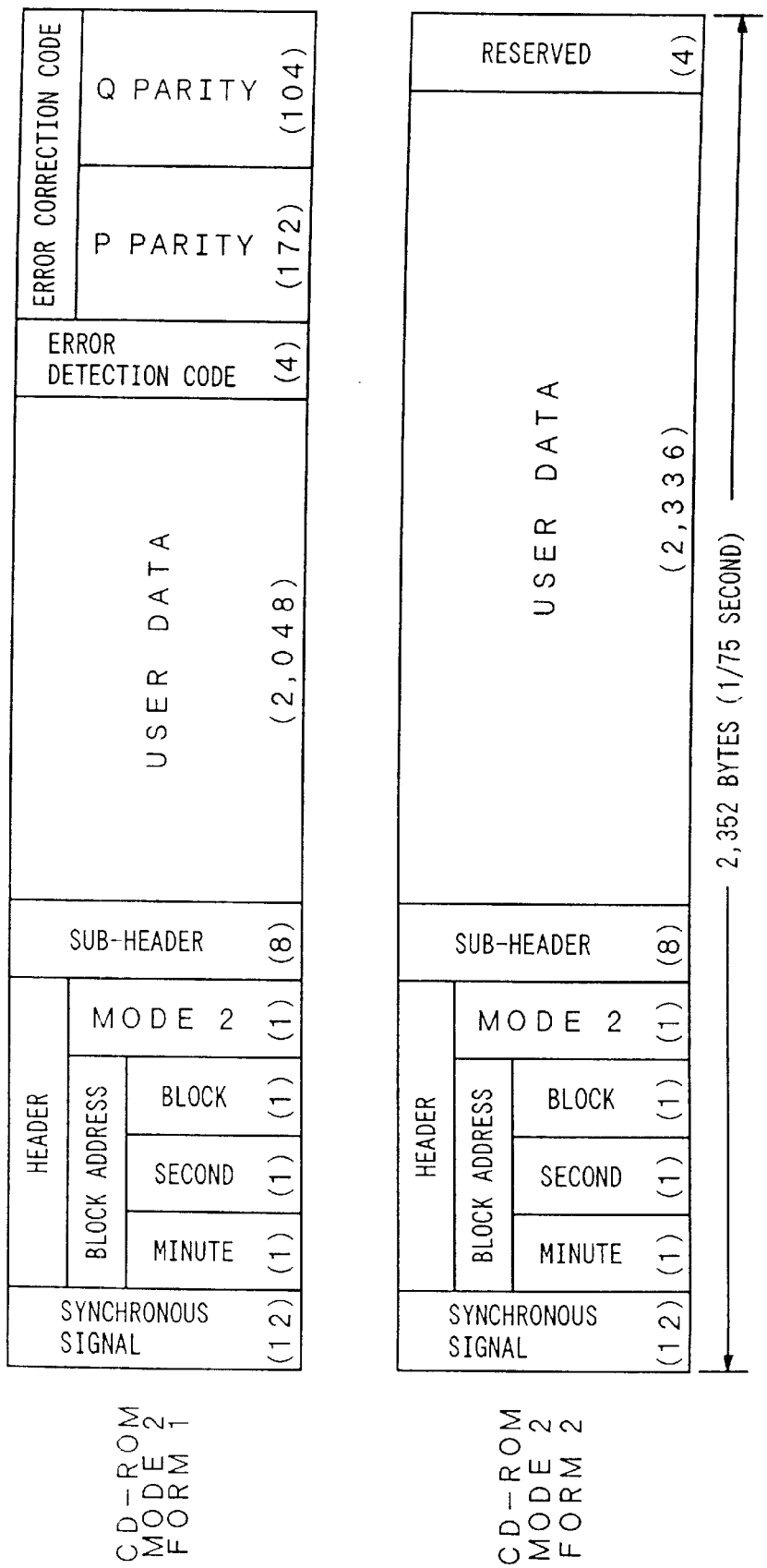
FIG. 8 is a schematic diagram for explaining a data structure of mode 2 of a conventional CD-ROM.

Further, as a modification of the mode 2 of the CD-ROM, form 1 and form 2 as shown in FIG. 8 are specified. A CD-I, a CD-ROM, an XA, a video CD, and the like have data structures of form 1 and form 2. In form 1 and form 2, in a manner similar to the CD-ROM, a sync of 12 bytes and a header of 4 bytes are added and mode information in the header is set to mode 2. After the header, a sub-header of 8 bytes is added. The sub-header is constructed by a file number, a channel number, a sub-mode, and a data type each consisting of 2 bytes.

In form 1, further, the error detection code of 4 bytes, a P parity of 172 bytes, and a Q parity of 104 bytes are added. A space in mode 1 of the CD-ROM does not exist. A region of the user data is composed of 2,048 bytes. In form 2, a reserve region (4 bytes) is provided and the region of the user data is composed of 2,324 bytes.

As mentioned above, as a sector size according to the CD format, a size of 2,352 bytes is used as a base and there are the following kinds of sector sizes depending on a handling of additional data (header, sub-code, and the like). The sectors having those sector sizes are called CD sectors.

The first sector size relates to data of the CD/CD-ROM and there are the following sector sizes.

2,352 bytes (=24 bytes×98, 2,340 bytes (remaining data excluding the sync of the CD-ROM)

2,336 bytes (user data of mode 2)

2,324 bytes (user data of mode 2 and form 2)

The second sector size relates to the data obtained by adding the sub-code to the data of the CD/CD-ROM and there are the following sector sizes.

2,450 bytes (all data including the sub-code or the like, 98×25)

2,448 bytes (remaining data excluding two bytes of the sync pattern)

2,364 bytes (in case of using only one channel of the sub-code)

Another example of the sector structure will now be described. According to the example, a data sync and a header are added to the structure having the sector size (2 kbytes) which is handled in case of the external memory apparatus of the computer, so that the sector structure has a size of 2,072 bytes. That is, as shown in FIG. 9A, the data sync (4 bytes) and the header (16 bytes) are added to the user data of 2,048 bytes (=2 kbytes) of one sector and an error detection code EDC (4 bytes) for improving the reliability is further added. Therefore, a length of one sector is equal to 2,072 bytes. The sector shown in FIG. 9A is referred to as a 2-byte sector.

FIG. 9B shows the details of the data of the header. Namely, the header is constructed by: 2 bytes of the error detection code (specifically speaking, CRC) for the header; one byte of management information CGMS for managing the permission or inhibition of the copy; one byte of a layer which is used to discriminate a single-layer disc or a multi-layer disc and which indicates the number of layers included in the disc or a number of a layer in which data has been recorded; 4 bytes of an address; and 8 bytes of the auxiliary data. According to the embodiment, a sector ID signal for identifying a sector structure is inserted into the auxiliary data.

Figure 2:
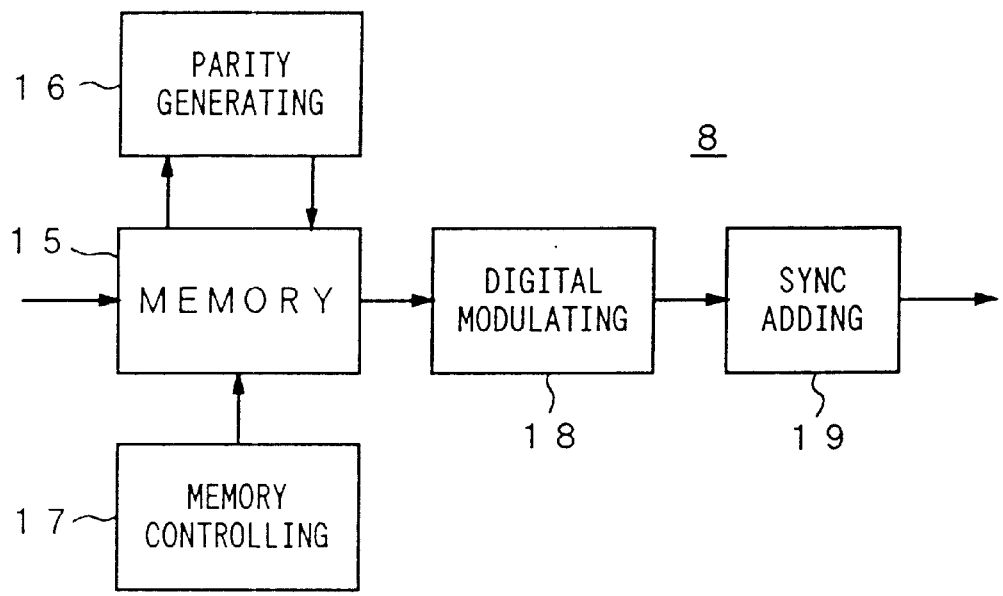
FIG. 2 is a block diagram of an example of a recording processing circuit in FIG. 1.

As mentioned above, various values can exist as data according to the CD format. Among them, there is a value which can be integrated to a block (for example, 16 kbytes) which is common to the foregoing 2-kbyte sector. For example, the value of 2,352 bytes is one example among them. In case of CD-DA, the user data of 2,352 bytes is included in 98 transmission frames. As shown in FIG. 10A, 2,352 bytes are used as user data and the data sync (4 bytes) and header (12 bytes) are added to the user data. Therefore, a length in one sector is equal to 2,368 bytes. As enlargedly shown in FIG. 10B, the header is constructed by CRC (2 bytes), copy management information CGMS, a layer, an address, and auxiliary data (4 bytes). The header in FIG. 10B has the same information as that of the header shown in FIG. 9B except that a length of auxiliary data is set to be shorter. The sector according to the CD format is referred to as a CD sector.

As mentioned above, a length of one sector of the 2-kbyte sector is different from that of the CD sector. In addition, although a ratio of the sizes of those sectors doesn't have a relation of an integer ratio, those sectors can be integrated to a block structure of a predetermined size. According to the embodiment, when it is assumed that two different sector sizes are set to A and B, blocks are specified so that the data of nA and mB (n and m are integers and n≠m and n>m) can be inserted into a data unit (referred to as a block) of a predetermined size, respectively. The data is recorded and reproduced (namely, accessed)of a block unit basis. As a method of defining n and m, n and m are selected so as to be relatively prime. Particularly, when the sizes of A and B are close, there are a method of considering so as to construct by m=n−1 and a method of constructing by n=$2^j$ (j is a natural number). A method of specifying m and n so as to be relatively prime is used in case of minimizing the block size. The method of specifying by n=$2^j$ is used in case of considering an amicability with the computer system. Further, m and n can be also selected to values which are integer times (for example, in case of two times, 2m and 2n) as large as both of them.

In the above example, when only the user data is considered, assuming that n=8 and m=7, 2,048 bytes×8=16,384 bytes 2,336 bytes×7=16,352 bytes They are enclosed in the block of 16 kbytes (16,384 bytes).

As shown in FIGS. 9 and 10 mentioned above, when a size in which a data sync and a header are added is considered as a sector size, since A'=2,072 and B'=2,368, n=8 and m=7 are selected. The block size is set to 2,072×8=2,368×7=16,576 bytes The common same block size can be specified.

Figure 11:
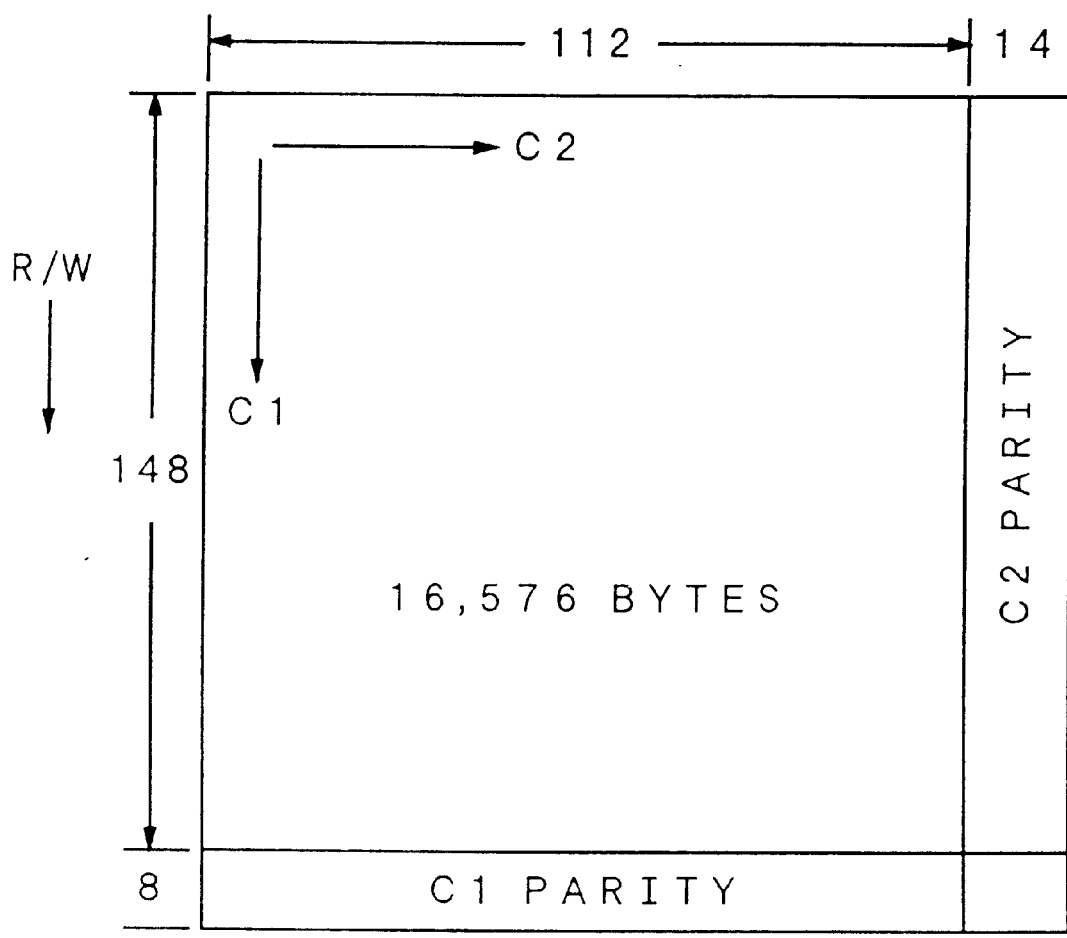
FIG. 11 is a schematic diagram showing an example of a data structure of a block in an embodiment of the invention.

As shown in FIG. 11, as a data structure of one block in this case, a 2-dimensional arrangement of (148×112=16,576 bytes) is specified. By applying an error correction code to the 2-dimensional arrangement, an error correcting ability can be raised. As an error correction code, a product code such that an encoding of a first error correction code (called a C1 code) is performed for 148 bytes in the vertical direction (each column), thereby forming a C1 parity of 8 bytes, and an encoding of a second error correction code (called a C2 code) is executed for 112 bytes in the lateral direction (each row), thereby adding a C2 parity of 14 bytes can be used.

As an error correction code of every block, in addition to the product code, a double encoding of a convolution type, an LDC (Long Distance Code), or the like similar to the case of a CD can be also used. A simple encoding by an error detection code can be also performed.

Figure 12A:
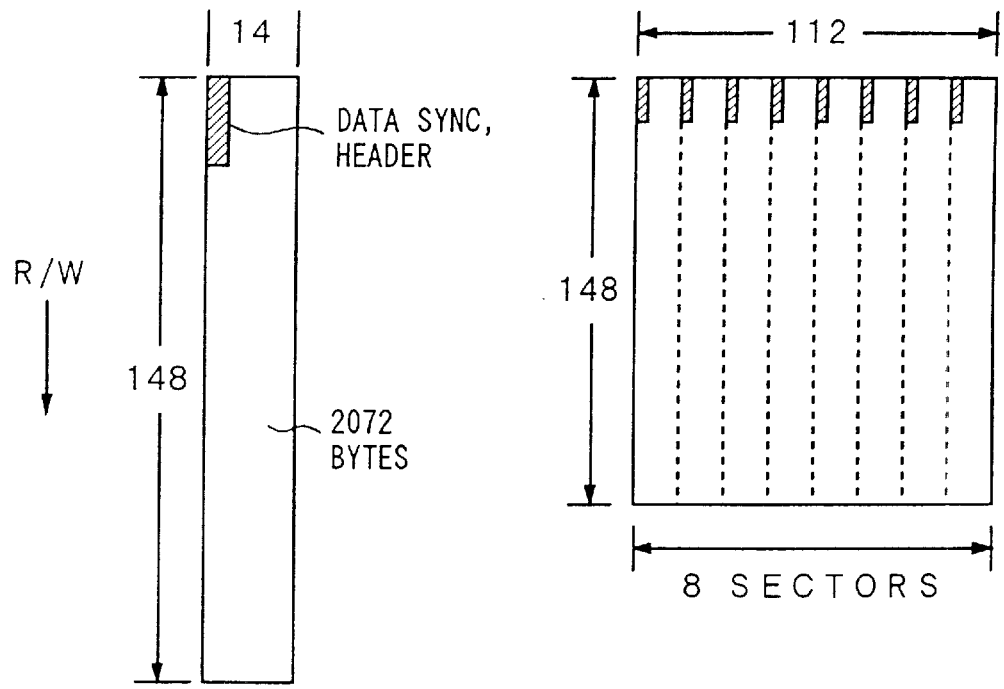
FIGS. 12A and 12B are schematic diagrams each showing the relation between the sector and the block in the embodiment.

A case of integrating the sectors of two different sizes to a block of the same size will now be more specifically explained with reference to FIGS. 12A and 12B. FIG. 12A shows a process of the sector size in case of 2,072 bytes shown in FIGS. 9A and 9B. One sector is divided every 148 bytes in the R/W direction, thereby forming a 2-dimensional arrangement of (148×14=2,072 bytes). Therefore, eight sectors of such an arrangement are included in one block and a data structure such that one block is constructed by eight sectors is formed.

Figure 12B:
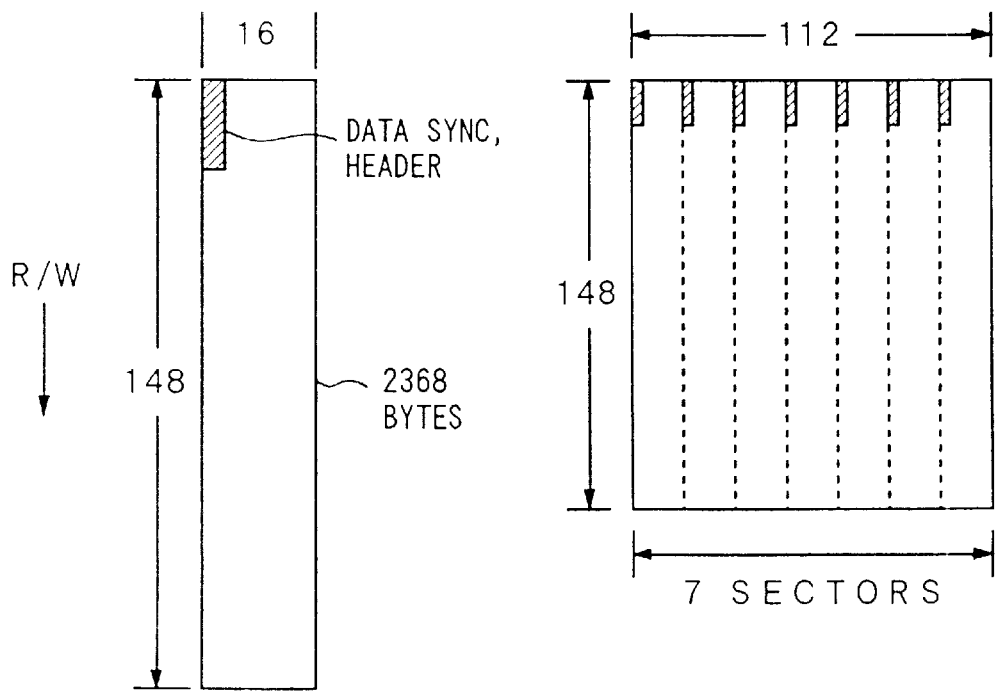

FIG. 12B shows a process of the sector size in case of 2,368 bytes shown in FIGS. 10A and 10B. One sector is divided every 148 bytes in the R/W direction, thereby forming a 2-dimensional arrangement of (148×16=2,368 bytes). Therefore, seven sectors of such an arrangement are included in one block and a data structure in which one block is constructed by seven sectors is formed. Upon recording/reproducing, a counter for counting 2,072 bytes or 2,368 bytes of the data is provided and seven or eight sector syncs are detected, thereby deciding a delimiter of the blocks. The invention is not limited to such a method but a block sync different from the sector sync can be also added.

Referring again to FIG. 1, a recording/reproducing circuit of the first embodiment of the invention will now be described. The digital data from the host computer 1 or CD-ROM drive 2 is supplied to formatting circuits 5a and 5b through the interface 4 such as an SCSI. The formatting circuits 5a and 5b divide the received digital data every sector, add a sector sync and a header, and execute an error detection encoding. Namely, the formatting circuit 5a converts the received data into a sector structure of a size of 2,072 bytes as shown in FIGS. 9A and 9B. The formatting circuit 5b converts the received data into a sector structure of a size of 2,368 bytes as shown in FIGS. 10A and 10B.

Output data of the formatting circuits 5a and 5b are selected by a switching circuit 6 and supplied to a block segmenting circuit 7. The switching circuit 6 is controlled by a control signal Sc which is outputted from the interface 4. The switching circuit 6 is switched in correspondence to the data received by the interface 4. When the interface 4 receives computer data which is outputted from the host computer 1 and should be recorded to the disc 3, the switching circuit 6 selects the output of the formatting circuit 5a. When the interface 4 receives the data from the CD-ROM drive 2, the switching circuit 6 selects the output of the formatting circuit 5b. When the interface 4 receives data according to a CD format as shown in FIGS. 7 and 8 from the host computer 1, the interface 4 identifies the sync signal and header which are specified by the CD format, controls the switching circuit 6, and selects the output of the formatting circuit 5b. Further, a control signal for selection is supplied to the formatting circuits 5a and 5b as necessary. The control signal is inserted as, for example, a part of auxiliary data to the header of each sector. Upon recording, the host computer 1 can also directly control the selection of the format.

The block segmenting circuit 7 constructs the block (16,576 bytes) comprising 7 or 8 sectors in correspondence to the format of the inputted data and performs an encoding of the error correction code of every block. The data from the block segmenting circuit 7 is supplied to a recording processing circuit 8. As will be explained hereinlater, the recording processing circuit 8 executes processes such as error correction encoding, digital modulation, and the like. Recording (writing) data is generated from the recording processing circuit 8.

The recording data is supplied to an optical pickup 10 through a driving circuit 9 and is recorded to the high-density optical disc 3. The data is recorded by a magneto-optic recording or a phase change. The optical disc 3 is rotated at a CLV (constant linear velocity) or a CAV (constant angular velocity) by a spindle motor 11. The minimum unit of the data to be recorded or reproduced by the optical pickup 10 is set to one block mentioned above. The recorded data is immediately reproduced by a read-after-write function and the presence or absence of an error of the reproduction data is judged. When there is an error, the writing operation is retried. Even in a reading mode, when the read-out data has an error, the reading operation is again performed. In the case where the correct data cannot be read even by performing the reading operation a predetermined number of times, this fact is informed to the user and the reading operation is interrupted.

The reproduction data read out by the optical pickup 10 is supplied to a detector 21 including an RF amplifier, a PLL circuit, and the like for extracting a clock. An output of the detector 21 is supplied to a servo control circuit 22 and a reproduction processing circuit 23. The servo control circuit 22 executes a control of a focusing servo, a tracking servo, and a feeding operation (seek) of the optical pickup 10, a control of a laser power upon recording, and the like. As will be explained hereinlater, the reproduction processing circuit 23 executes processes such as digital demodulation, error correction, and the like.

A block desegmenting circuit 24 is connected to the reproduction processing circuit 23. In the block desegmenting circuit 24, the reproduction data is desegmented every block as shown in FIG. 11 and the error correction code of the block is decoded. The block desegmenting circuit 24 executes a process opposite to the process of the block segmenting circuit 7 on the recording side and outputs the data of a sector structure. Deformatting circuits 25a and 25b and a header detecting circuit 26 are connected to the block desegmenting circuit 24. Although not shown, a timing signal synchronized with the block sync detected by the reproduction processing circuit 23 is supplied to the block desegmenting circuit 24.

The deformatting circuit 25a executes a process opposite to the process of the formatting circuit 5a on the recording side. The deformatting circuit 25b executes a process opposite to the process of the formatting circuit 5b. By the deformatting circuit 25a, user data of 2,048 bytes is extracted from the sector of 2 kbytes of the high density optical disc 3 shown in FIG. 9A and an error detection is performed. By the deformatting circuit 25b, user data of 2,336 bytes is extracted from the CD sector shown in FIGS. 10A and 10B and an error detection is performed. The header detecting circuit 26 detects the header added every sector and decides a format of the sector on the basis of the information of the header. Although not shown, the timing signal from the reproduction processing circuit 23 is supplied to the deformatting circuits 25a and 25b.

One of the user data extracted by the deformatting circuits 25a and 25b is supplied to the interface 4 selected by a switching circuit 27. The switching circuit 27 is controlled by the header information from the header detecting circuit 26 and selects the output of the deformatting circuit 25a or 25b which executes the process corresponding to the sector structure of the data which was actually reproduced. The reproduction data selected by the switching circuit 27 is supplied to the interface 4. As mentioned above, the data reproduced from the optical disc 3 can be transmitted to the host computer 1 through the interface 4.

According to the first embodiment of the invention as mentioned above, the host computer 1 can fetch the data comprising the CD sector read out by the CD-ROM drive 2. In addition to it, the data comprising the CD sector read out by the CD-ROM drive 2 or the data comprising the sector of 2 kbytes can be recorded (written) to the high density optical disc 3. The host computer 1 can fetch the data reproduced from the optical disc 3 or the data of the CD-ROM.

As mentioned above, the data from the host computer 1 and the data read out from the CD-ROM can be recorded or reproduced to/from the same optical disc 3. However, the invention can be also applied to a hybrid disc such that a data region of the same optical disc is divided into two regions and one of them is allocated to a region (RAM region) for data for the high density optical disc and the other is allocated to a region (ROM region) for data of the CD-ROM. In this case as well, there is an advantage such that the data recorded into two regions has the same block structure and the recording and reproducing processes can be simplified.

An example of the recording processing circuit 8 in FIG. 1 will now be described with reference to FIG. 2. The data from the block segmenting circuit 7 is written into a semiconductor memory (RAM) 15. In association with the memory 15, a parity generating circuit 16 and a memory controlling circuit 17 are provided and a parity of the error correction code such as a double code of a convolution type, which will be explained hereinlater, is formed. The data added with the parity is supplied to a digital modulating circuit 18.

The digital modulating circuit 18 maps, for example, a data symbol of one byte (8 bits) to a code word of 16 bits in accordance with a predetermined table, thereby generating a modulation output with a little DC component. An EFM in a CD, an 8–15 modulation for converting the data symbol of 8 bits into a code word of 15 bits, or the like can be also obviously used as a digital modulation. An output of the digital modulating circuit 18 is supplied to a sync adding circuit 19. A block sync is added to the head of each block. An output of the sync adding circuit 19 is supplied to the driving circuit 9 in FIG. 1 and is recorded to the optical disc 3 by the optical pickup 10. A unique bit pattern such that it doesn't appear in the modulated data is used as a block sync. The sector structure can be identified by using the bit pattern.

Figure 3:
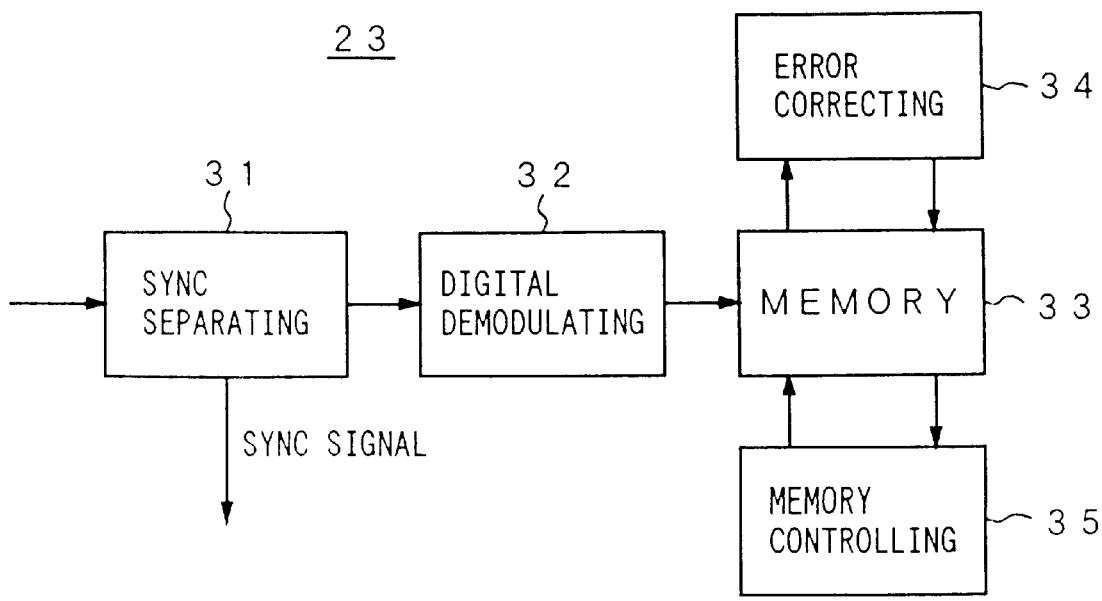
FIG. 3 is a block diagram of an example of a reproduction processing circuit in FIG. 1.

FIG. 3 shows an example of the reproduction processing circuit 23. The reproduction data from the detector 21 is supplied to a sync separating circuit 31 and a block sync is separated. Although not shown, the separated block sync is supplied to a timing generating circuit, so that a timing signal of a block period synchronized with the reproduction data is generated. A digital demodulating circuit 32 is connected to the sync separating circuit 31. The data in which one symbol was returned to one byte is generated from the demodulating circuit 32 by the process opposite to that of the digital modulating circuit 16.

Output data of the digital demodulating circuit 32 is written into a semiconductor memory (RAM) 33. An error correcting encoder 34 and a memory controlling circuit 35 are connected to the memory 33. An error correction of the reproduction data is performed by the error correcting encoder 34. The error corrected data is read out from the memory 33 and is supplied to the block desegmenting circuit 24 shown in FIG. 1.

In the case where the sector of 2 kbytes and the CD sector mentioned above have a sector size of 2,072 bytes and a sector size of 2,368 bytes, respectively, eight or seven sectors are included in the (112×148) blocks. However, in case of the CD sector which includes a Q channel of a sub-code as user data and in which a sector size is set to (2,352+12=2,364 bytes), the data cannot be just inserted into the above block. According to the invention, therefore, one block is constructed by seven CD sectors and a block header of 28 bytes.

Namely, one block is composed of (2,364×7+28=16,576 bytes) and can be united to the same block size as that of the sector of 2 kbytes. A structure of 28 bytes of the block header comprises a block sync (8 bytes), a block address (4 bytes), and auxiliary data AUX (16 bytes). The block header is added so as to be located at the head of the data of each block in the recording/reproducing direction.

Figure 4:
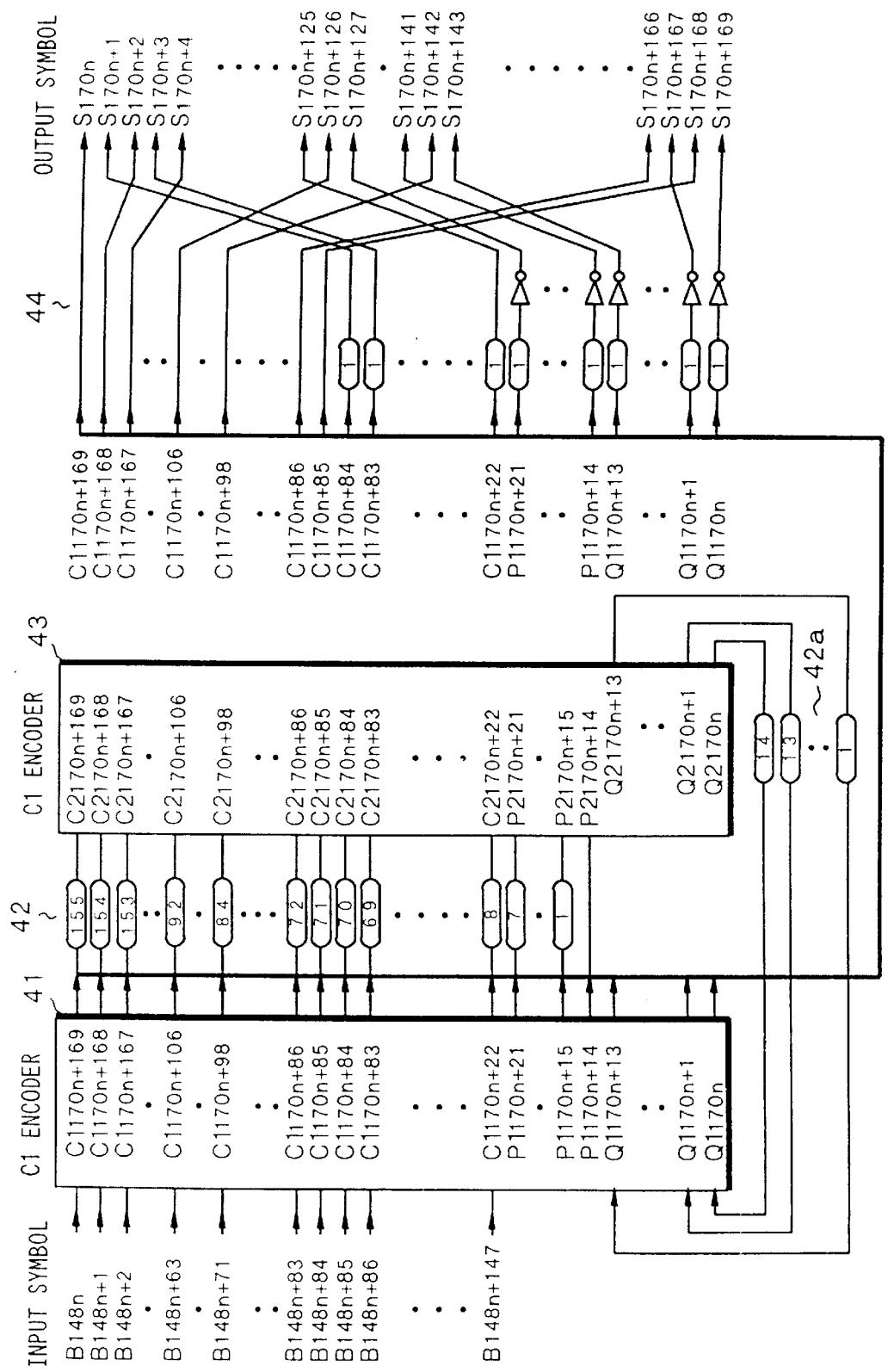
FIG. 4 is a block diagram showing an example of a process for error correction encoding in the recording processing circuit.

An example of the error correction code which is used in the recording processing circuit 8 and reproduction processing circuit 23 will now be described. FIG. 4 is a block diagram showing a process for encoding the error correction code which is executed by the memory 15, parity generating circuit 16, and memory controlling circuit 17 of the recording processing circuit 8. The error correction code is similar to a cross-interleaved Reed Solomon code (example of the double encoding of the convolution type) which is used in the CD.

An input symbol of 148 bytes is supplied to a C1 encoder 41. An output (148 bytes of a data symbol and 8 bytes of a C1 parity P) of the C1 encoder 41 is supplied to a C2 encoder 43 through a group of delay circuits 42 for interleaving. The C2 encoder 43 forms a C2 parity Q of 14 bytes by the encoding of the [170, 156, 15] Reed Solomon code. In the C1 encoder 41, since not only the data but also the C2 parity Q is C1 encoded, the C2 parity Q is fed back from the C2 encoder 43 to the C1 encoder 41 through a group of delay circuits 42a. Therefore, the C1 encoder 41 performs the encoding of [170, 162, 9] Reed Solomon code.

170 bytes (comprising the data of 148 bytes, C1 parity of 8 bytes, and C2 parity of 14 bytes) from the C1 encoder 41 are extracted as an output symbol through an arrangement changing circuit 44 including delay circuits. The output symbol is supplied to the digital modulating circuit 18. An interleave length (also called a restriction length of the interleave or a depth of the interleave) of the double encoding of the convolution type is equal to 170 frames ("frame" here denotes a length of C1 code sequence and is equal to a length of two frames of the foregoing transmission frame) in correspondence to the maximum delay amount due to the delay circuits.

Processes of a decoder corresponding to the encoder shown in FIG. 4 will now be described with reference to FIG. 5. The input symbol (170 bytes) from the digital demodulating circuit 32 is supplied to a C1 decoder 52 through an arrangement changing circuit 51. The arrangement changing circuit 51 executes a process opposite to that of the arrangement changing circuit 44 of the encoder. The C1 decoder 52 performs a decoding of [170, 162, 9] Reed Solomon code.

An output of the C1 decoder 52 is supplied to a C2 decoder 54 through a group of delay circuits 53. The C2 decoder 54 performs a decoding of [170, 156, 15] Reed Solomon code. Further, a decoding output of the C2 decoder 54 is supplied to a C1 decoder 56 through a group of delay circuits 55 for deinterleaving. As mentioned above, by the processes of the C1 decoding, C2 decoding, and C1 decoding, an error corrected output symbol of 148 bytes is extracted.

Figure 13:
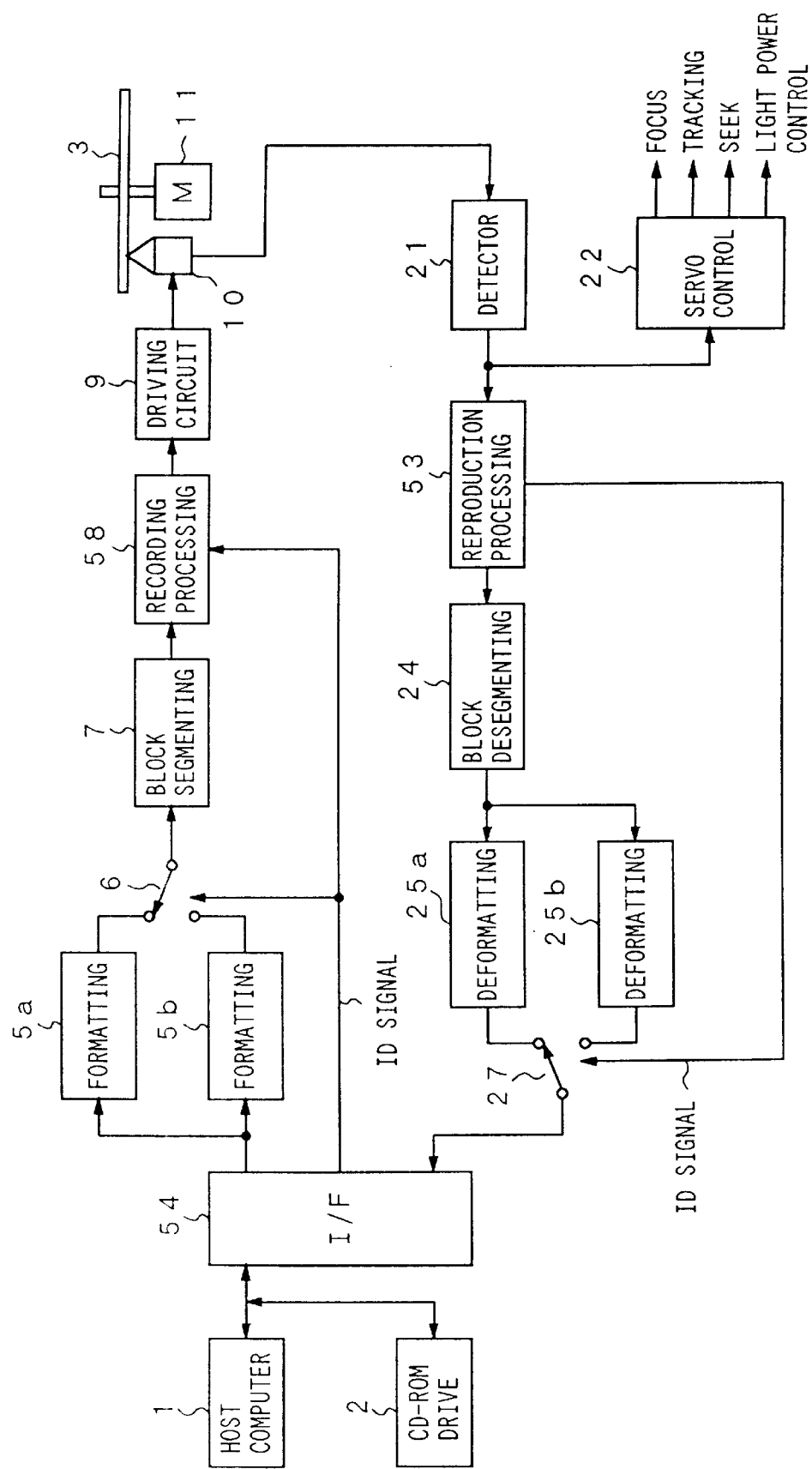
FIG. 13 is a block diagram of another embodiment of the recording/reproducing circuit according to the invention.

Another example of the foregoing recording/reproducing circuit will now be described with reference to FIG. 13. The circuits having the same functions as those of the circuits shown in FIG. 1 are designated by the same reference numerals and their descriptions are omitted.

The output data of the formatting circuits 5a and 5b is selected by the switching circuit 6 and supplied to the block segmenting circuit 7. The switching circuit 6 is controlled by an ID signal which is outputted from an interface 54. The switching circuit 6 is switched in correspondence to the data received by the interface 54. When the interface 54 receives the user data of 2,048 bytes from the host computer 1, the switching circuit 6 selects the output of the formatting circuit 5a by an ID signal. When the interface 54 receives the data according to the CD or CD-ROM format from the host computer 1 or CD-ROM drive 2, the interface 54 discriminates the sync signal and header in a transmission format of the CD shown in, for example, FIG. 7 or 8 and generates the ID signal, thereby allowing the switching circuit 6 to select the output of the formatting circuit 5b. Further, as will be explained hereinlater, the ID signal is supplied to a recording processing circuit 58, so that a sync signal (a sector sync, an additional sync S1, a C1 sync S2, a sector sync S3 or S4, and a block sync S5) to identify the received data is generated.

One of the user data extracted by the deformatting circuits 25a and 25b is selected by the switching circuit 27 and supplied to the interface 54. The switching circuit 27 is controlled by an ID signal from a reproduction processing circuit 53 and selects an output of the deformatting circuit 25a or 25b which executes the process corresponding to the sector structure of the data which was actually reproduced. The ID signal is formed by judging the pattern of the sector sync. The reproduction data selected by the switching circuit 27 is supplied to the interface 54. As mentioned above, the data reproduced from the optical disc 3 can be transmitted to the host computer 1 through the interface 54.

Figure 14:
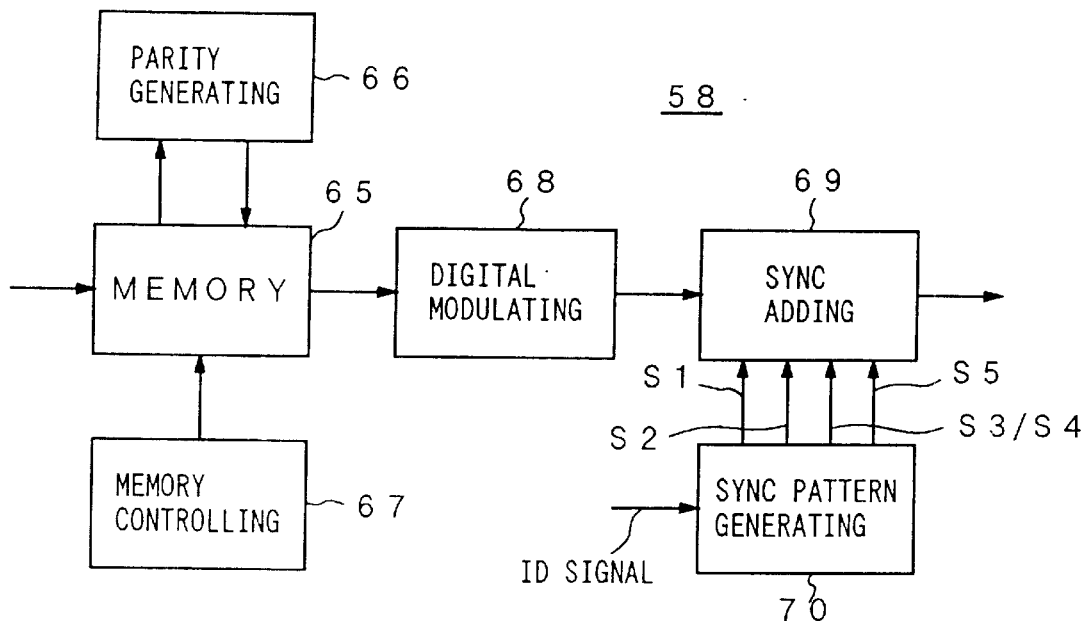
FIG. 14 is a block diagram showing an example of a recording processing circuit in FIG. 13.

An example of the recording processing circuit 58 in FIG. 13 will now be described with reference to FIG. 14. The data from the block segmenting circuit 7 is written into a semiconductor memory (RAM) 65. In association with the memory 65, a parity generating circuit 66 and a memory controlling circuit 67 are provided and a parity of an error correction code such as a double code of a convolution type, which will be explained hereinlater, is generated. The data added with the parity is supplied to a digital modulating circuit 68.

As will be explained in detail hereinbelow, the digital modulating circuit 68 maps a data symbol of, for example, one byte (eight bits) to a code word of 16 bits in accordance with a predetermined table, thereby generating a modulation output with a little DC component. An EFM in the CD, an 8–15 modulation for converting the data symbol of 8 bits into the code word of 15 bits, or the like can be also obviously used as a digital modulation. An output of the digital modulating circuit 68 is supplied to a sync adding circuit 69.

The additional sync S1, C1 sync 52, sector sync S3 or S4, and block sync S5 generated by a sync pattern generating circuit 70 are supplied to the sync adding circuit 69. An ID signal and a timing signal such as a clock or the like (not shown) are supplied to the sync pattern generating circuit 70. One of the sector syncs S3 and S4 is selectively generated by the ID signal. The additional sync S1, C1 sync S2, sector sync S3 or S4, and block sync S5 are added by the sync adding circuit 69. An output of the sync adding circuit 69 is supplied to the driving circuit 9 in FIG. 13 and is recorded to the optical disc 3 by the optical pickup 10. As will be explained hereinlater, as those syncs, a unique bit pattern such that it doesn't appear in the modulated data is used.

According to an embodiment of the invention, the sector structure is identified by the sector syncs S3 and S4 of different bit patterns. Namely, as sector sizes including the data sync and header, a sector of 2 kbytes having a size of 2,072 bytes (FIGS. 9A and 12A) for a high density disc and a CD sector having a size of 2,368 bytes (FIGS. 10B and 12B) for the CD-ROM are specified. To identify the two sector sizes, the sync adding circuit 69 adds the sector sync S3 to the sector of 2 kbytes for the high density disc and adds the sector sync S4 to the CD sector for the CD-ROM.

Figure 15:
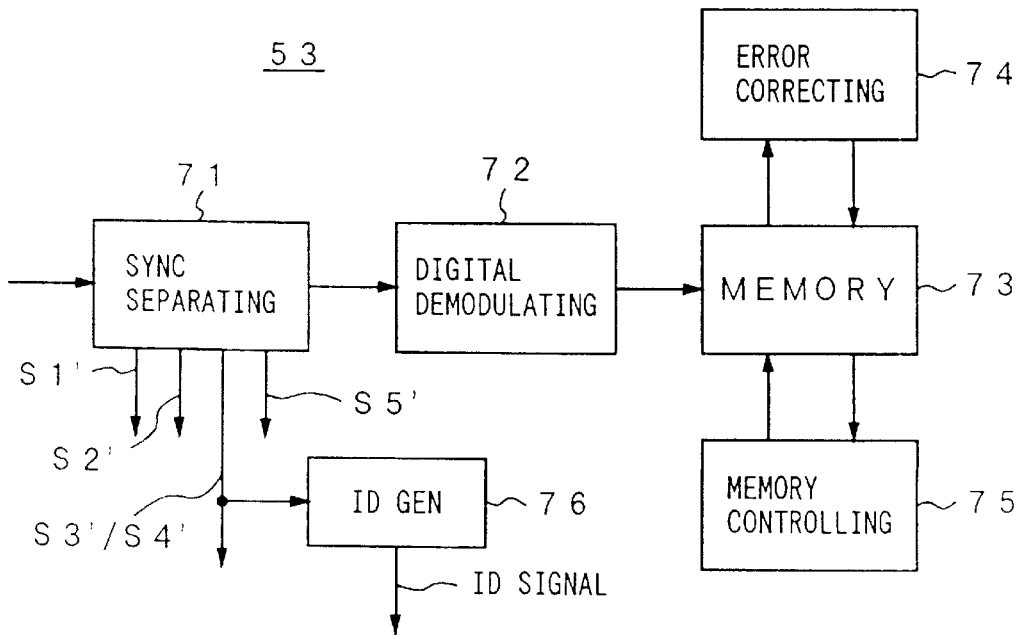
FIG. 15 is a block diagram of an example of a reproduction processing circuit in FIG. 13.

FIG. 15 shows an example of the reproduction processing circuit 53. The reproduction data from the detector 21 is supplied to a sync separating circuit 71. Sync detection signals S1', S2', S3' or S4', and S5' corresponding to the additional sync S1, C1 sync S2, sector sync S3 or S4, and block sync S5 are generated from the sync separating circuit 71, respectively. Although not shown, those sync detection signals are supplied to a timing generating circuit and various timing signals such as sector period, block period, and the like synchronized with the reproduction data are generated.

The sync detection signal S3' or S4' corresponding to the sector sync is supplied to an ID signal generating circuit 76. The ID signal generating circuit 76 generates an ID signal in correspondence to the detected sector sync (S3 or S4). As mentioned above, the switching circuit 27 in FIG. 13 is controlled by the ID signal and one of the output signals of the deformatting circuits 25a and 25b is selected.

A digital demodulating circuit 72 is connected to the sync separating circuit 71. By the process opposite to that of the digital modulating circuit 68, the data in which the code word was returned to the data symbol is generated from the demodulating circuit 72. Output data from the digital demodulating circuit 72 is written into a semiconductor memory (RAM) 73. An error correcting circuit 74 and a memory controlling circuit 75 are connected to the memory 73. The reproduction data is error corrected by the error correcting circuit 74. The data which had been read out from the memory 73 and was error corrected is supplied to the block desegmenting circuit 24 shown in FIG. 13.

Figure 5:
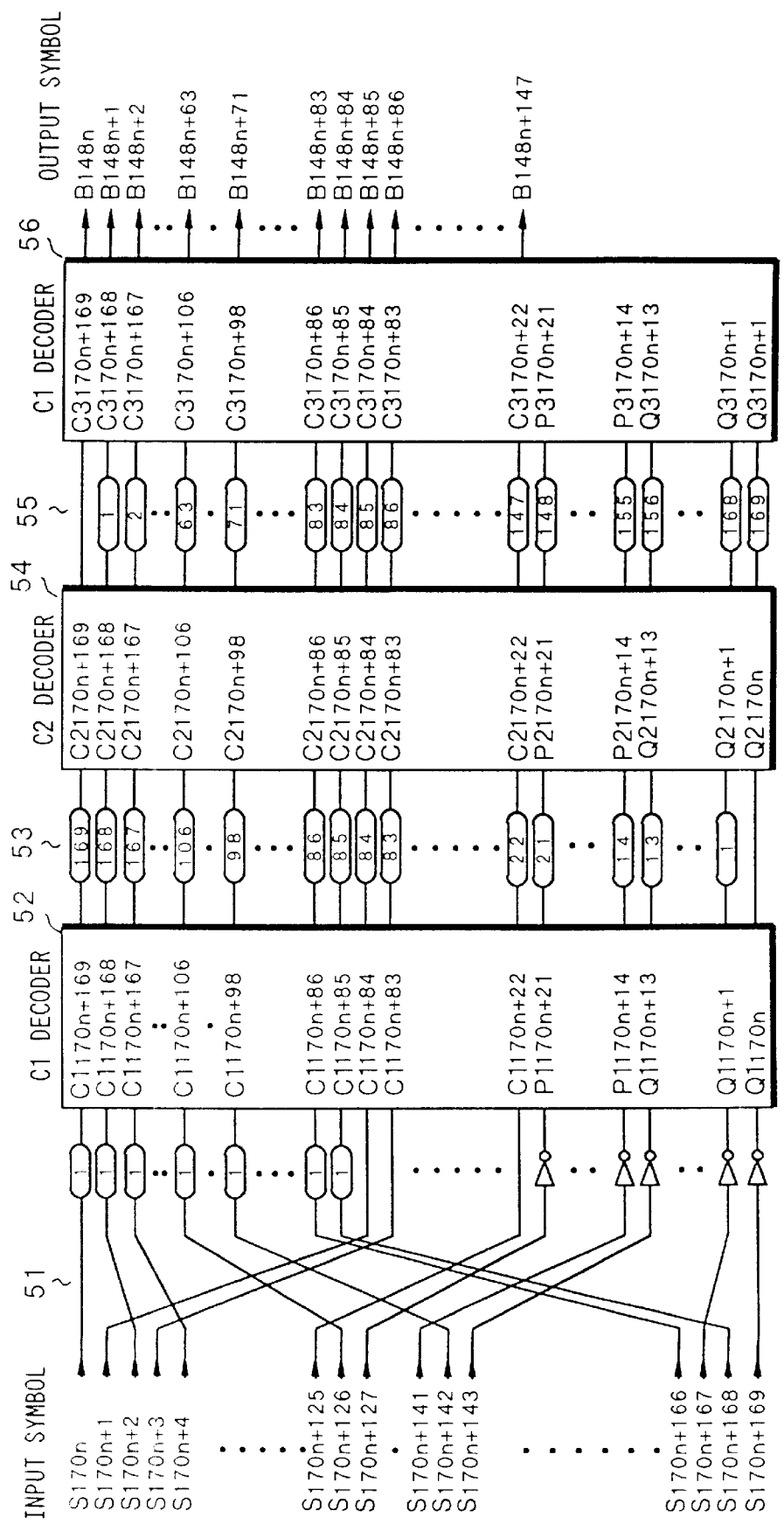
FIG. 5 is a block diagram showing an example of a process for decoding of an error correction code in the reproduction processing circuit.

The encoding and decoding of the error correction code which is used in the recording processing circuit 58 and reproduction processing circuit 53 are realized by the circuit blocks which have already been described by using FIGS. 4 and 5.

The recording data which is outputted from the recording processing circuit 58 will now be described with reference to FIGS. 16A, 16B and 16C.

Figure 17:
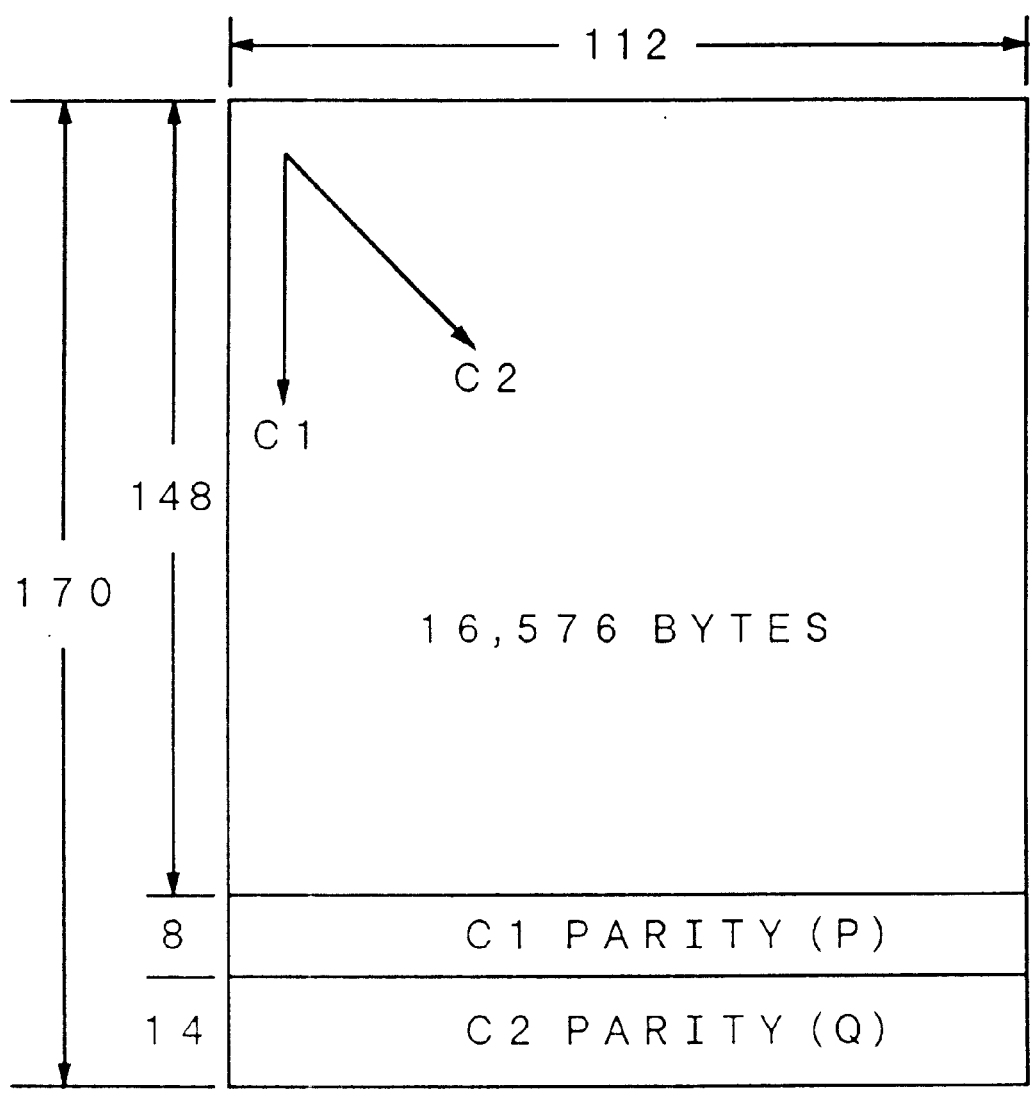
FIG. 17 is a schematic diagram showing a data structure of a block in another embodiment of the recording/reproducing circuit according to the invention.

As a data structure of one block in this case, as shown in FIG. 17, a 2-dimensional arrangement of (148×112=16,576 bytes) is specified and by applying the error correction code to the 2-dimensional arrangement, an error correcting ability can be raised. As an error correction code, an encoding of a first error correction code (referred to as a C1 code) is executed for 162 bytes in the vertical direction (each column) and a C1 parity of 8 bytes is formed. An encoding of a second error correction code (referred to as a C2 code) is executed for 156 bytes in the oblique direction and a double encoding of the convolution type such that a C2 parity of 14 bytes is added is used.

Figure 16A:
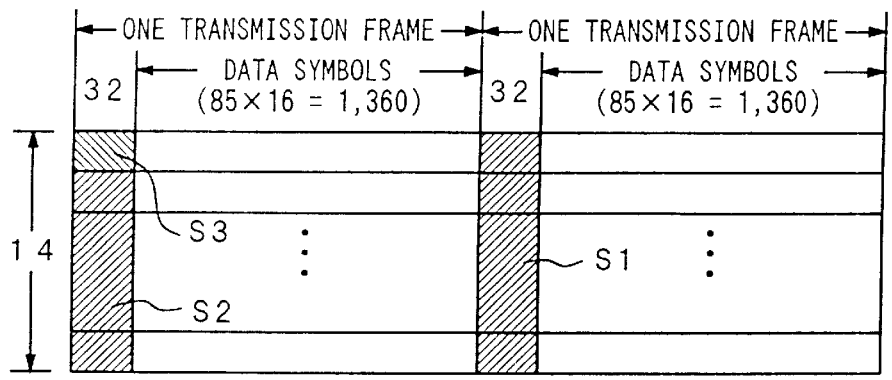
FIGS. 16A to 16C are schematic diagrams for explaining a transmission frame of recording data and a sync to be added.

FIG. 16A shows recording data for the high density disc. As shown in FIG. 12A, one sector (2,072 bytes) is divided every 148 data. The memory controlling circuit 67 controls the memory 65 and parity generating circuit 66 so as to execute the double encoding of the convolution type to such data and the parity P of 8 bytes and the parity Q of 14 bytes are added. Therefore, as shown in FIG. 17, (148+22=170) data symbols are formed in the memory 65. The data symbols are equally divided into 85 data symbols. The 85 data symbols are inputted to the digital modulating circuit 68 and converted into (85×16=1,360) channel bits by a digital modulation (8–16 modulation).

In the sync adding circuit 69, the sector sync S3 of 32 channel bits or C1 sync S2 from the sync pattern generating circuit 70 is added to the former half modulated data symbols. Thus, data of one transmission frame of (1,360+32=1,392 channel bits) is constructed. The additional sync S1 of 32 channel bits is added to the latter half modulated data symbols. One transmission frame is similarly constructed. As shown in FIG. 24A, (14×2=28) transmission frames construct the recording data of one sector for the high density disc. In place of the C1 sync S2, the sector sync S3 is added to the head transmission frame of the 28 transmission frames.

Figure 16B:
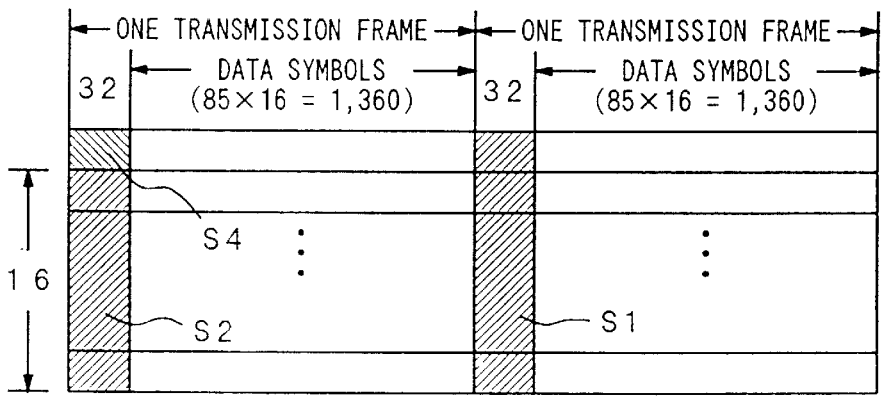

FIG. 16B shows the recording data of one sector for the CD-ROM. The recording data of one sector is constructed by (16×2=32) transmission frames of the same format as that of the recording data for the high density disc mentioned above. In the sync adding circuit 69, in place of the C1 sync S2, the sector sync S4 from the sync pattern generating circuit 70 is added to the head transmission frame.

Figure 16C:
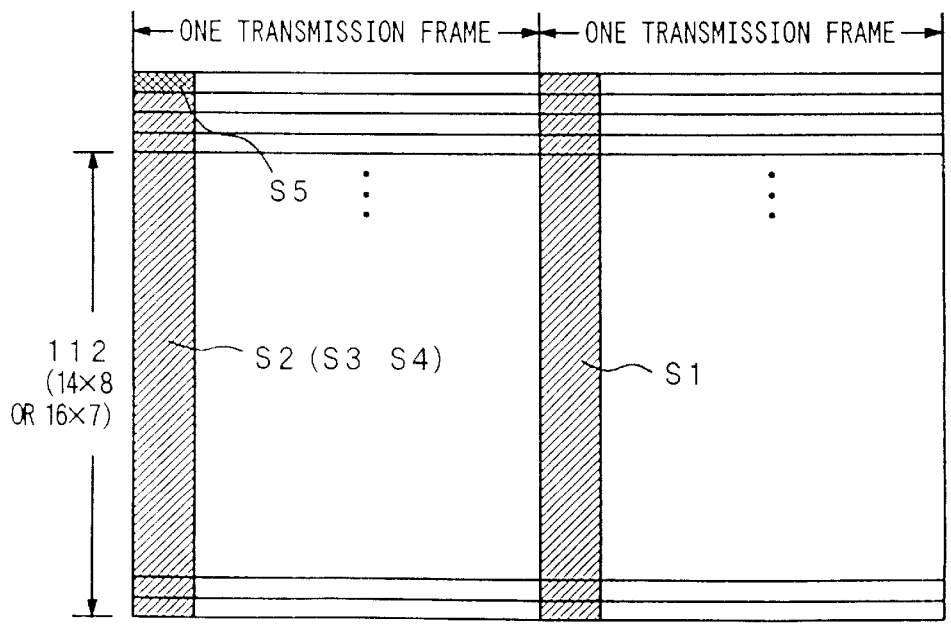

FIG. 16C shows one method for adding the block sync S5. As mentioned above, one block is constructed by eight sectors for the high density disc or seven sectors for the CD-ROM. Therefore, with respect to the head transmission frame of the head sector in one block, the sync adding circuit 69 adds the block sync S5 in place of the sector sync S3 or S4. The sync adding circuit 69 adds the sector sync S3 or S4 with regard to the head transmission frame of the other sector. The block sync S5 can be also added independent of the sector sync. Further, it is not always necessary to add the block sync S5. The block desegmenting circuit 24 can also detect a delimiter of the blocks by counting the number of sector syncs S3 or S4.

Figure 18A:
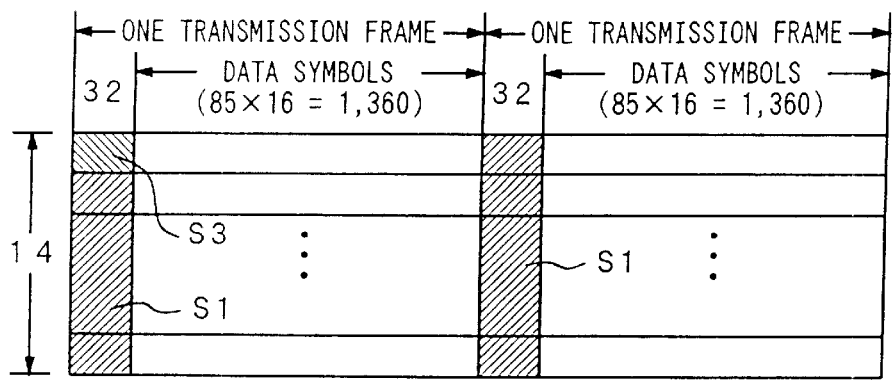
FIGS. 18A to 18C are schematic diagrams for explaining modifications of the sync to be added to the transmission frame.
Figure 18B:
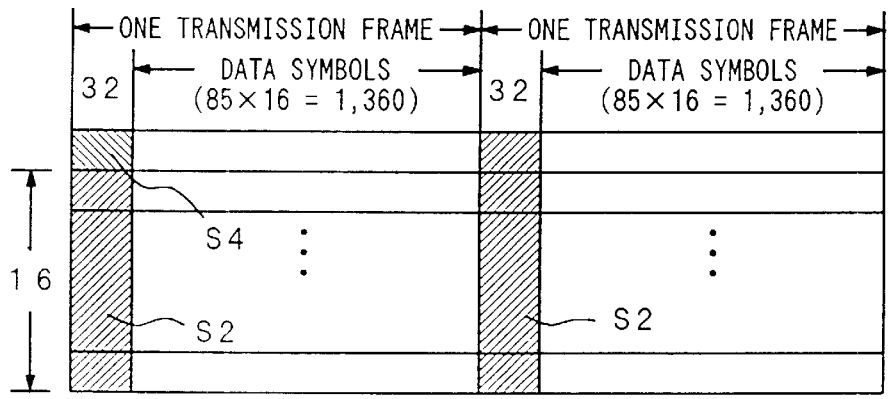
Figure 18C:
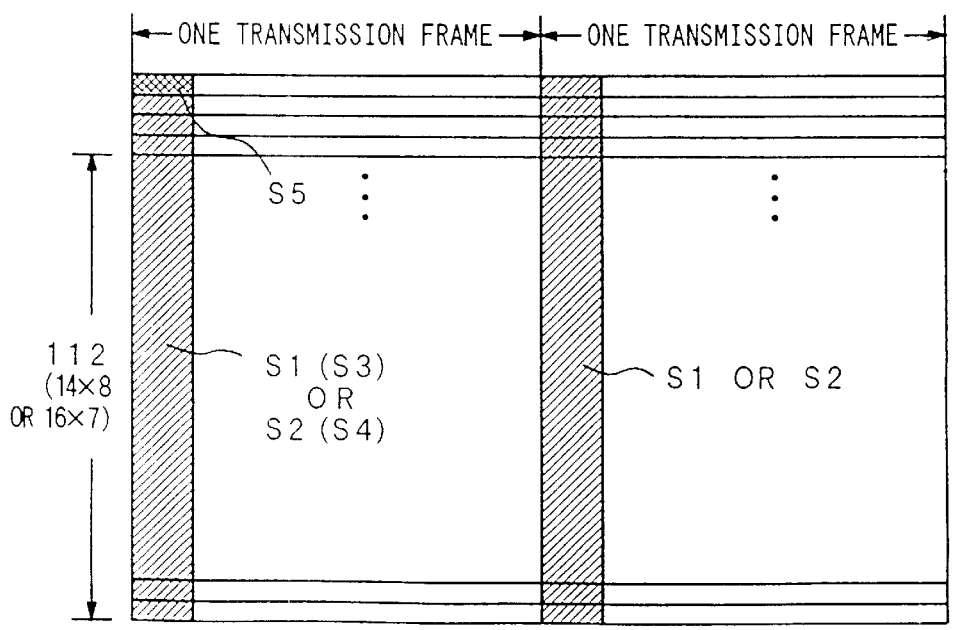

According to the above embodiment, further, since the syncs S1 and S2 have been prepared as syncs for the transmission frame, the sector structure can be also discriminated by using them in the reproduction processing circuit 53. Namely, as shown in FIG. 18A, in the recording data for the high density disc, only the additional sync S1 is used as a sync for the transmission frame. On the other hand, in the recording data for the CD-ROM, as shown in FIG. 18B, only C1 sync S2 is added to each transmission frame. By using this method, the sector can be discriminated from the pattern of the head sync of each transmission frame. FIG. 26C shows a construction of the recording data of the whole block. In the example of FIGS. 18A, 18B and 18C, as a sector sync, it is not always necessary to use both of the sector syncs S3 and S4. For example, the sector sync S4 in FIG. 18B can be substituted by the sector sync S3.

FIG. 19 shows a specific bit pattern of the sync which is generated by the sync pattern generating circuit 70. The bit pattern of the sync in case of using an (8–16) modulation, which will be explained hereinlater, is shown as a digital modulating system. Statuses 1, 2, 3, and 4, which will be explained hereinlater, relate to the (8–16) modulating system. A bit pattern of the sync in the statuses 1 and 2 and a bit pattern of the sync in the statuses 3 and 4 are specified, respectively. The case where the most significant bit (MSB) is equal to "0" relates to the statuses 1 and 2. The case where the MSB is equal to "1" relates to the statuses 3 and 4. The bits are sequentially inserted into the transmission frame from the MSB.

The bit patterns of the additional sync S1, C1 sync S2, sector sync S3 or S4, and block sync S5 are different as shown in FIG. 19. Those bit patterns don't appear in the code word sequence in which the data symbols are modulated. More specifically speaking, by including the patterns in which two inversion intervals of 11T (T: bit cell of the channel bit) continue, it will be understood that the data is a sync word. Those bit patterns have been stored in the sync pattern generating circuit 70 and can be also outputted to the sync adding circuit 69 in accordance with the ID signal which is inputted and the timing signal (not shown).

The (8–16) modulation that is executed by the digital modulating circuit 68 shown in FIG. 22 will now be described hereinbelow. According to the modulating method, each of the data symbols of 8 bits which are inputted is converted into the code word of 16 channel bits, respectively. The code word is directly connected to the next code word, namely, it is coupled without intervening a coupling (or margin) bit in the EFM. A part of a conversion table for converting the data symbol to the code word has been doubled. In the double portion, a set of corresponding codes has a construction such that change amounts of digital sum variations are opposite with respect to the positive and negative signs and the absolute values are set to close values.

The digital modulating circuit 68 has such a conversion table.

FIG. 20 shows an example of such a conversion table. As shown in FIG. 20, the conversion table comprises a plurality of (for example, four) kinds of unit tables T1, T2, T3, and T4 and each unit table has a double portion. Namely, now assuming that a table of one set of code words for all of the data symbols in one unit table is set to Ta, a part of Ta is doubled to thereby form a table Tb. In the specific example of FIG. 20, 88 portions of values 0 to 87 of the data symbols are doubled. In the following description, the table Ta is called a front table and the table Tb is called a back table.

In the specific example of FIG. 20, a conversion table is constructed by four kinds of tables (front tables) T1a, T2a, T3a, and T4a of the 256 code words corresponding to the data symbols 0 to 255 of 8 bits and tables (back tables) T1b, T2b, T3b, and T4b in which the portions of the data symbols 0 to 87 of the tables T1a, T2a, T3a, and T4a were respectively doubled. In the example, with respect to the code words of the doubled portions in the conversion table, namely, the portions of the data symbols 0 to 87 of the tables T1a, T2a, T3a, and T4a and the code words of the tables T1b, T2b, T3b, and T4b, the set of corresponding code words has a construction such that change amounts of digital sum variations are opposite with regard to the positive and negative signs and absolute values are set to close values.

An embodiment of a modulating method using the conversion table of FIG. 20 will now be described hereinbelow. The (8–16) modulation also satisfies the condition (3T~11T rule) of the EFM such that the number of "0" between "1" and "1" is equal to 2 or more and is equal to or less than 10. In the EFM, although there is one kind of table for converting the data symbols into the code words, in the (8–16) modulating system, a few kinds of tables for converting the data symbols into the code words are provided. In the example of FIG. 20, four kinds of unit tables T1, T2, T3, and T4 are used. "Status values" which are used to classify the kinds of unit tables will now be described.

The status value has a role as an index to decide which conversion table should be used when converting the data symbols into the code words. The number of status values, therefore, is equal to the number of unit tables of the conversion table. Namely, in the example, four status values ("1" to "4") exist in correspondence to the four kinds of unit tables T1, T2, T3, and T4, respectively.

The status value changes each time one data symbol is converted into the code word. When the code word is finished as "1" or "10", the status value is changed to "1". When the code word is finished as continuous "0" of the number that is equal to or larger than 2 and is equal to or less than 5, the status value is changed to "2" or "3". When the code word is finished as continuous "0" of the number that is equal to or larger than 6 and is equal to or less than 9, the status value is changed to "4".

The table for converting the data symbols into the code words has the following features.

Since the unit table T1 which is used when the status value is equal to "1" satisfies the condition (3T~11T rule) such that the number of "0" between "1" and "1" is equal to or larger than 2 and is equal to or less than 10, the unit table T1 is constructed by only the code words which start from at least two "0". This is because the code word modulated before the status value is changed to "1" is finished as "1" or "10".

The unit table T2 or T3 which is used when the status value is equal to "2" or "3" is constructed by only the code words which start from 0 to 5 continuous "0" because of a similar reason. However, the unit table T2 which is used when the status value is equal to "2" is constructed by the codes in which both of the first and 13th bits are equal to "0" in the case where the MSB is set to the first bit. The unit table which is used when the status value is equal to "3" is constructed by the codes such that either one or both of the first and 13th bits are equal to "1". The unit table T4 which is used when the status value is equal to "4" is constructed by only the code words starting from "1" or "01".

The code words which can be commonly used for two different status values exist. For example, the code word which starts from three continuous "0" and in which the first and 13th bits are equal to "0" or the like can be also used when the status value is equal to "1" and when the status value is equal to "2". Such codes need to construct the table so that the values of the data symbols are certainly equal in consideration of the case of decoding.

The code word of the type such that the status value is subsequently changed to "2" or "3" can be allocated to two exactly different kinds of values of the data symbols. In such a case, the decoding cannot be unconditionally performed from only such codes. However, one of the status values that are changed is certainly set to "2" and the other is set to "3", so that the codes can be correctly decoded. This method will be described hereinlater.

For the codes of all of the unit tables, further, in the case where the data symbols were converted into the codes, another table indicating to which one of "1" to "4" the next status value is changed is provided. When the code word is finished as continuous "0" of the number that is equal to or larger than 2 and is equal to or less than 5, whether the status value is subsequently changed to "2" or "3" cannot be decided from only the feature of the code. However, by referring to such a table, the next status value can be unconditionally determined. It is assumed that after the sync pattern, the status value is certainly set to "1". In the example of FIG. 20, the next status value is shown by S and tables composed of the status values S in the changing direction are respectively formed.

The digital modulating circuit 68 converts the data symbols of 8 bits into the code words by using those tables. The present status value is stored in the internal memory, the table to be referred to is obtained from the status, and the signal of 8 bits is converted into the code word by such a table, thereby performing the modulation. At the same time, the next status value is derived from the table and stored so that the table to be referred to when the next conversion is executed can be obtained.

A control of the DSV (digital sum variation or digital sum value) will now be explained. How many kinds of code words which can satisfy a limitation (3T~11T rule) of a run length and can be used without a problem exist is considered every status value mentioned above. In this instance, in order to inhibit the occurrence of the same two-times repetitive pattern of 11T as the sync pattern, a code word such that ten "0" are arranged and five "0" are arranged and finished after subsequent "1" is preliminarily eliminated. This is because when a code word such that five "0" continuously start after such a code is connected, the two-times repetitive pattern of 11T occurs. In the case where the status value is changed to "2" or "3" after completion of the conversion into the code word, since the code can be used by two kinds of methods, those two kinds of codes are counted to two-times.

By calculating them, there are 344 kinds of code words which can be used when the status value is equal to "1", there are 345 kinds of code words which can be used when the status value is equal to "2", there are 344 kinds of code words which can be used when the status value is equal to "3", and there are 411 kinds of code words which can be used when the status value is equal to "4". Since the data symbol to be inputted consists of 8 bits, it is sufficient that there are 256 kinds of codes. With respect to each status value, at least 88 kinds of codes remain. Therefore, the 88 residual codes are used for controlling the DSV. Namely, by using the residual codes, a table of an entry number 88, namely, what is called a back table is separately provided. In this example, with respect to the data symbols "0" to "87", they are constructed by using such a back table.

In the DSV control system, in order to most efficiently execute the DSV control, constructing principles of the front and back tables are set as follows. As mentioned above, a code word which can be commonly used for the two different status values exists. As for those codes, since it is necessary to construct the table so that the values of the data symbols are certainly equal, when considering its limitation, a method of constructing the table is actually fairly complicated. Since it is an object to show the constructing method of the table to efficiently control the DSV, each status value is independently considered for simplicity and an explanation will be made on the assumption that the code words which can be used in each status value can be freely allocated to the values of the data symbols.

Figure 21:
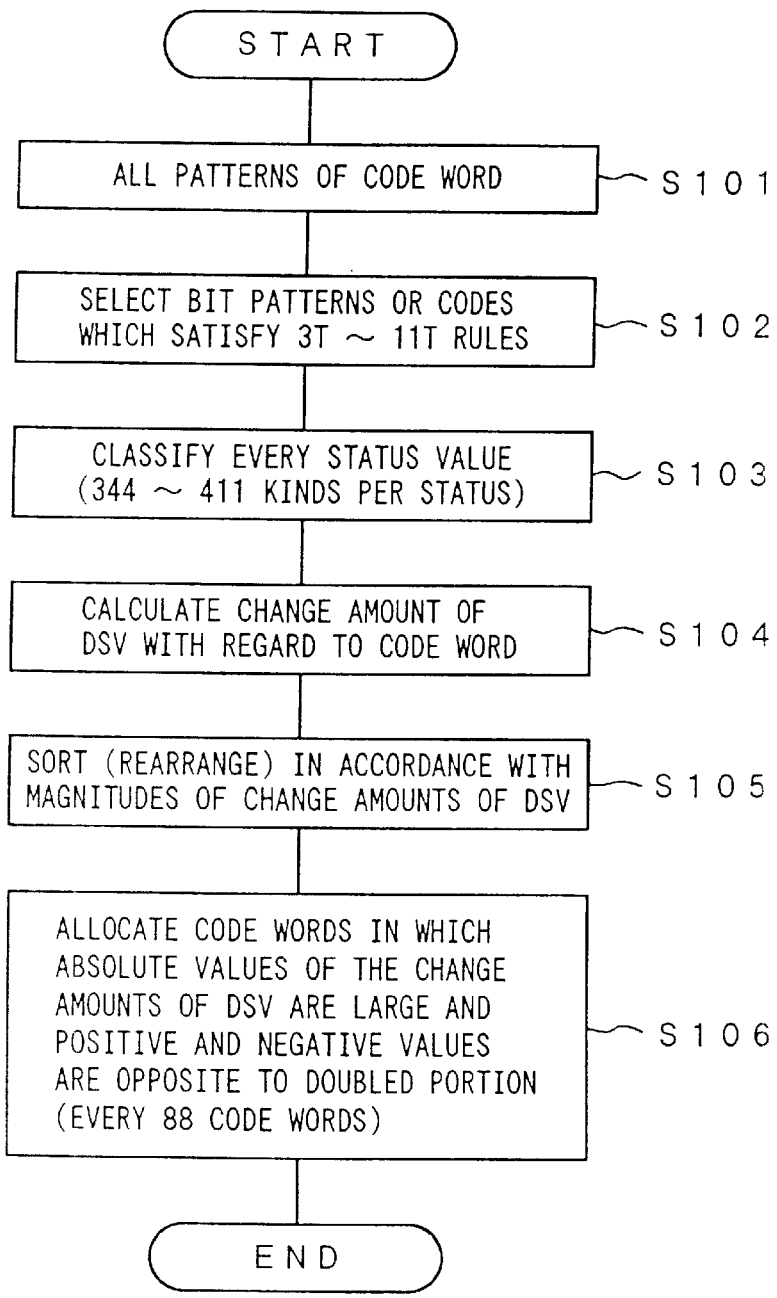
FIG. 21 is a flowchart showing an example of an algorithm constructing the conversion table of the (8–16) modulation.

FIG. 21 is a flowchart for explaining the constructing method of the conversion table as mentioned above, more specifically, a constructing method about an arbitrary one of the four kinds of unit tables of the conversion table. In FIG. 21, in step S101, all patterns of the code words are obtained. In step S102, the bit patterns or codes which satisfy the condition of the limitation (3T~11T rule) of the run length are selected. In step S103, they are classified to the codes according to the condition of every status value mentioned above. As mentioned above, there are 344 or 411 kinds of code words which can be used every status value. For example, there are 344 kinds of code words which can be used when the status value is equal to "1".

In step S104, a change amount of the DSV in the case where the level (=CWLL) just before is the low level is calculated with respect to all of the codes of each of the status values. When considering that a length of code is equal to 16 bits and there is the limitation (3T~11T rule) of the run length, the change amount of the DSV per one code is equal to −10 at minimum and +10 at maximum. In the case where the status value is equal to, for example, "1", the change amount is equal to −10 at minimum and +6 at maximum.

In step S105, for example, what is called a sorting for sequentially arranging the 344 kinds of code words in the case where the status value is equal to "1" in accordance with the order from the change amount of the DSV which is large in the positive direction to the change amount which is large in the negative direction is executed.

In step S106, 88 code words are sequentially selected in accordance with the order from the change amount of the DSV which is large in the positive direction and are sequentially allocated to the data symbols "0" to "87" in the front table T1*a* shown in FIG. 22 in the case where the status value is equal to "1". In this instance, among the selected 88 code words, the code word in which the absolute value of the change amount of the DSV is larger is allocated to the smaller value of the data symbol. The 88 code words are sequentially selected from the change amount of the DSV that is large in the negative direction and, for example, are allocated to "0" to "87" of the data symbols in the back table T1*b* in FIG. 22. In this instance, among the selected 88 code words, the code word in which the absolute value of the change amount of the DSV is larger is allocated to the smaller value of the data symbol. Finally, the 168 code words are sequentially selected from the code word in which the absolute value of the change amount of the DSV is small and, for example, are allocated to "88" to "255" of the data symbols in the front table T1*a* in FIG. 22.

Actually, when the status value is equal to "1", as shown in FIG. 22, since there are 344 kinds of code words which can be used, all of the codes which can be used at this stage are selected. FIGS. 23, 24, and 25 show examples of the allocation of the data symbols in the unit tables of the conversion table which are used when the status values are equal to "2", "3", and "4", respectively.

With respect to FIGS. 22 to 25, when the above sorting is performed, the order of the code words in which the change amounts of the DSV are equal is made different from that in the example of FIG. 20 mentioned above, even if any table is used, there will be no problem.

By constructing the front table Ta and back table Tb by the constructing principles as mentioned above, in the case where the data symbols have the values within a range from "0" to "87", either one of the two code words in which the absolute values of the change amounts of the DSV are relatively large and the signs are opposite can be selected, so that the DSV control can be efficiently performed. In the case where the data symbols have the values within a range from "88" to "255", the code words are unconditionally determined and the DSV control cannot be performed. However, since only the code words in which the absolute values of the change amounts of the DSV are relatively small are selected as those code words, the absolute value of the accumulated DSV can be always held small.

The back table Tb of the entry number 88 which was defined here has substantially the same feature as the front table Ta of the entry number 256 except that the entry number is small. The DSV control is performed by using the back table Tb together with the front table Ta. Assuming that the data symbols lie within a range from "0" to "87", when the data symbols are converted into the code words, which one of the front table Ta and the back table Tb is used can be properly selected. In this example, therefore, as in case of the DSV control in the conventional EFM, the accumulated DSV is always calculated and the accumulated DSV in the case where the conversion was performed by using the front table Ta and the accumulated DSV in the case where the conversion was performed by using the back table Tb are respectively obtained, and the conversion is executed while selecting the accumulated DSV whose absolute value is closer to zero.

Figure 26:
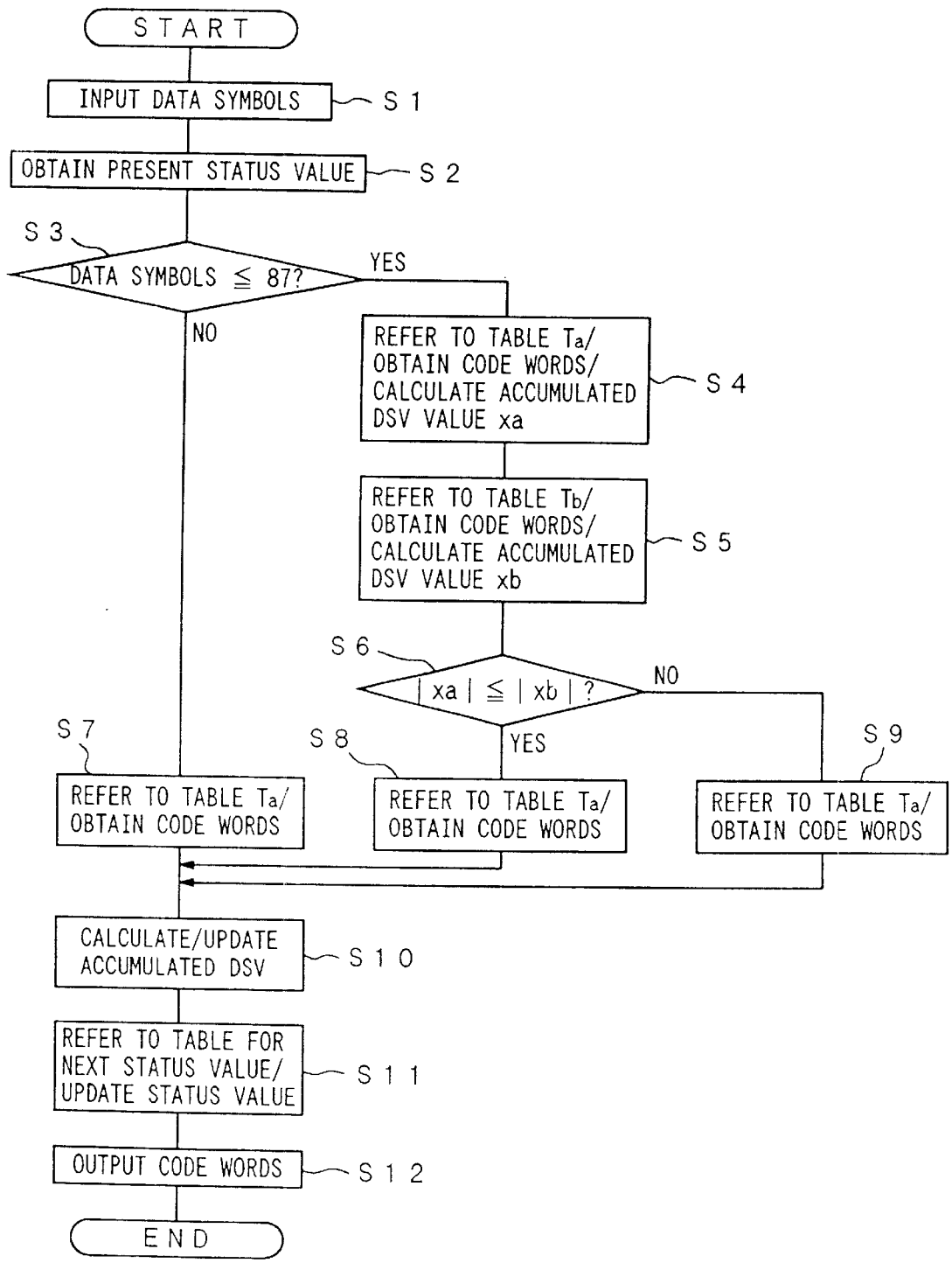
FIG. 26 is a flowchart for explaining an (8–16) modulating process.

An algorithm of a signal modulating system using the conversion table with such a construction will now be described with reference to FIG. 26. In step S1, when the data symbol is inputted, the present status value is obtained in step S2. After that, in step S3, a check is made to see if the value of the data symbol of 8 bits is equal to or less than 87 or not.

If YES in step S3, namely, when it is judged that the value of the data symbol is equal to or less than 87, step S4 follows. The code word corresponding to the data symbol is obtained with reference to the front table Ta according to the present status value and an accumulated DSV value xa is calculated. In step S5, the code word corresponding to the data symbol is obtained with reference to the back table Tb according to the present status value and an accumulated DSV value xb is calculated. In step S6, the relation of the magnitudes of the absolute values of the accumulated DSV values xa and xb, namely, whether |xa|≦|xb| or not is judged.

If NO in step S3, namely, when it is judged that the value of the data symbol is larger than 87, step S7 follows. The code word corresponding to the data symbol is obtained with reference to the front table Ta according to the present status value and step S10 follows. If YES in step S6, namely, when |xa|≦|xb| is judged, the code word is obtained with reference to the front table Ta and step S10 follows. If NO in step S6, namely, when it is judged that the absolute value of the accumulated DSV value xb of the code of the back table Tb is smaller, the code word is obtained with reference to the back table Tb and step S10 follows.

In step S10, after the calculation and updating of the accumulated DSV were performed, in step S11, a table for the next status values, namely, a table in which the next status values in FIG. 20 are combined is referred to and the status values are updated. In step S12, the obtained code word is outputted.

The (8–16) modulation is performed as mentioned above. Repeating tire explanation, the invention is not limited to the (8–16) modulation but can be also applied to a digital modulating system such as EFM, (8–15) modulation, or the like.

The value of 16 kbytes of the size of block as a set of a plurality of sectors mentioned above is shown as an example. It will be obviously understood that another block size such as 32 kbytes or the like can be also used in consideration of the application or the like. In the invention, there is no need to unite the different sector size to the block of the same size but the invention can be also applied to a case corresponding to a plurality of kinds of block sizes. Further, the invention is not limited to a disk-shaped recording medium but can be also applied to a case where a semiconductor memory of a large capacity is used as a data recording medium.

The second embodiment of a data structure in a block will now be described. According to the second embodiment of the invention, different from the above first embodiment, in the formatting circuit 5a, 22 bytes of a sync, a header, an error detection code EDC, and the like are added to user data of 2,048 bytes of one sector. Therefore, a length of one sector is set to 2,070 bytes. In the formatting circuit 5b, on the other hand, 34 bytes of a sync, a header, an error detection code EDC, and the like are added to the user data of 2,450 bytes (data including 98 bytes of a sub-code in the CD or CD-ROM) of one sector or 36 bytes of a sector sync, a header, an error detection code EDC, and the like are added to the user data of 2,448 bytes (remaining data excluding the sync pattern of 2 bytes in the sub-code) of one sector. Thus, a length of one sector is equal to 2,484 bytes.

As mentioned above, when a size to which the sync and header were added is considered as a sector size, since A'=2,070 and B'=2,484, n=12 and m=10 are selected and the block sizes are as follows.

2,070×12=24,840 bytes 2,484×10=24,840 bytes

The common same block size (24 kbytes) can be specified. A part in the channels of P to W of the sub-code, for example, only the Q channel can be also included in the sector. In this case, the sector size is set to (2,352 bytes+12 bytes=2,364 bytes).

Figure 27:
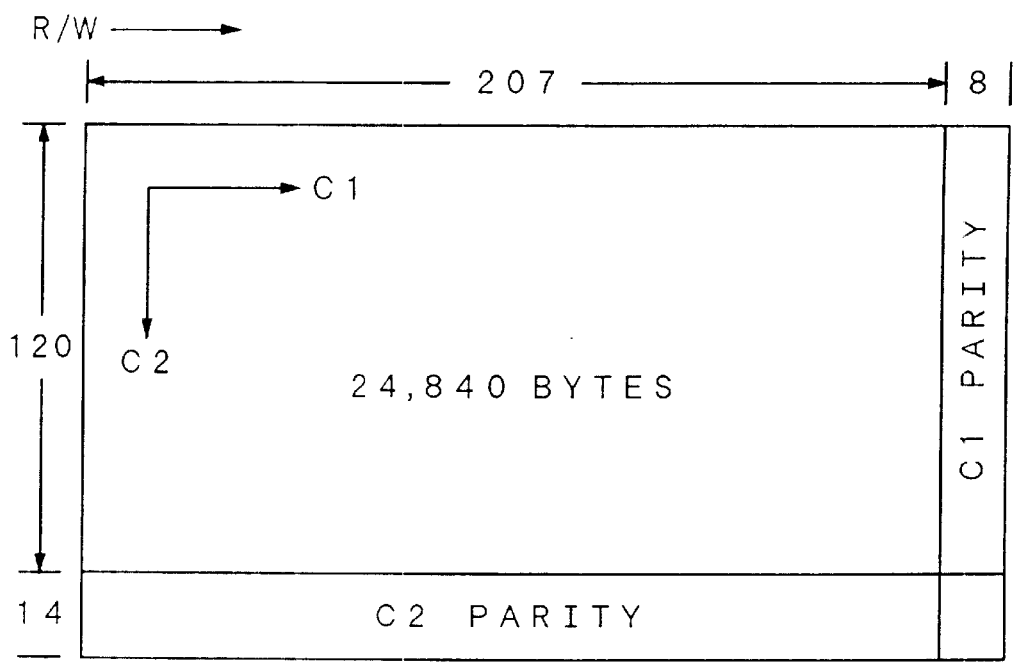
FIG. 27 is a schematic diagram showing the second embodiment in a data structure of a block.

As a data structure of one block in this case, as shown in FIG. 27, a 2-dimensional arrangement of (207×120=24,840 bytes) is specified. As an error correction code, a product code such that an encoding of a first error correction code (called a C1 code) is executed for 207 bytes in the lateral direction (each row), thereby generating a C1 parity of 8 bytes, and an encoding of a second error correction code (called a C2 code) is performed for 120 bytes in the vertical direction (each column), thereby adding a C2 parity of 14 bytes can be used.

Figure 28A:
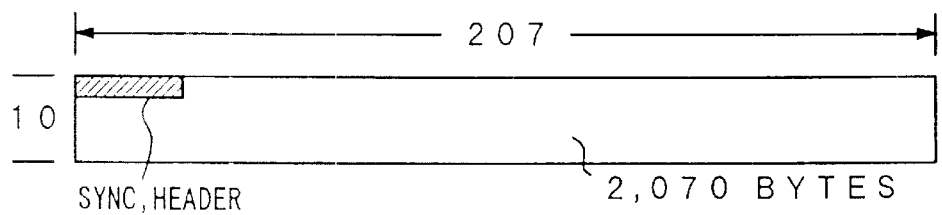
FIGS. 28A and 28B are schematic diagrams showing examples of two data structures of sectors in the block of FIG. 27.

A case of uniting the sectors of two different sizes to the block of the same size will now be more specifically described with reference to FIGS. 27 and 28. A process of the sector size in case of 2,070 bytes shown in FIG. 28A will now be described. In the block segmenting circuit 7, one sector is divided every 207 bytes in the R/W direction, thereby forming a 2-dimensional arrangement of (207×10= 2,070 bytes). Therefore, 12 sectors having such an arrangement are included in one block shown in FIG. 27 and a data structure in which one block consists of 12 sectors is formed.

Figure 28B:
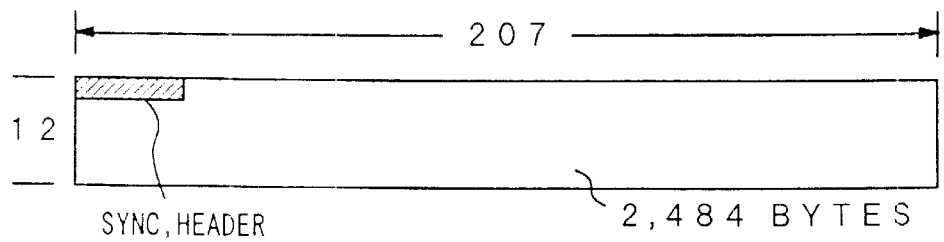

The process of the sector size in case of 2,484 bytes shown in FIG. 28B will now be described. The block segmenting circuit 7 divides one sector every 207 bytes in the R/W direction, thereby forming a 2-dimensional arrangement of (207×12=2,484 bytes). Therefore, 10 sectors having such an arrangement are included in one block shown in FIG. 27 and a data structure in which one block consists of 10 sectors is formed.

The third embodiment of the block data structure of the invention will now be described. According to the third embodiment of the invention, 24 bytes of a sync, a header, an error detection code EDC, and the like are added to the user data of 2,048 bytes of one sector by the formatting circuit 5a. Therefore, a length of one sector is set to 2,072 bytes. In the formatting circuit 5b, on the other hand, 16 bytes of a sector sync, a header, an error detection code EDC, and the like are added to the user data of 2,352 bytes of one sector. Thus, a length of one sector is set to 2,368 bytes.

As mentioned above, when a size to which the sector sync and header were added is considered as a sector size, since A'=2,072 and B'=2,368, n=16 and m=14 are selected and the block sizes are as follows.

2,072×16=33,152 bytes 2,368×14=33,152 bytes

The common same block size (32 kbytes) can be specified.

Figure 29:
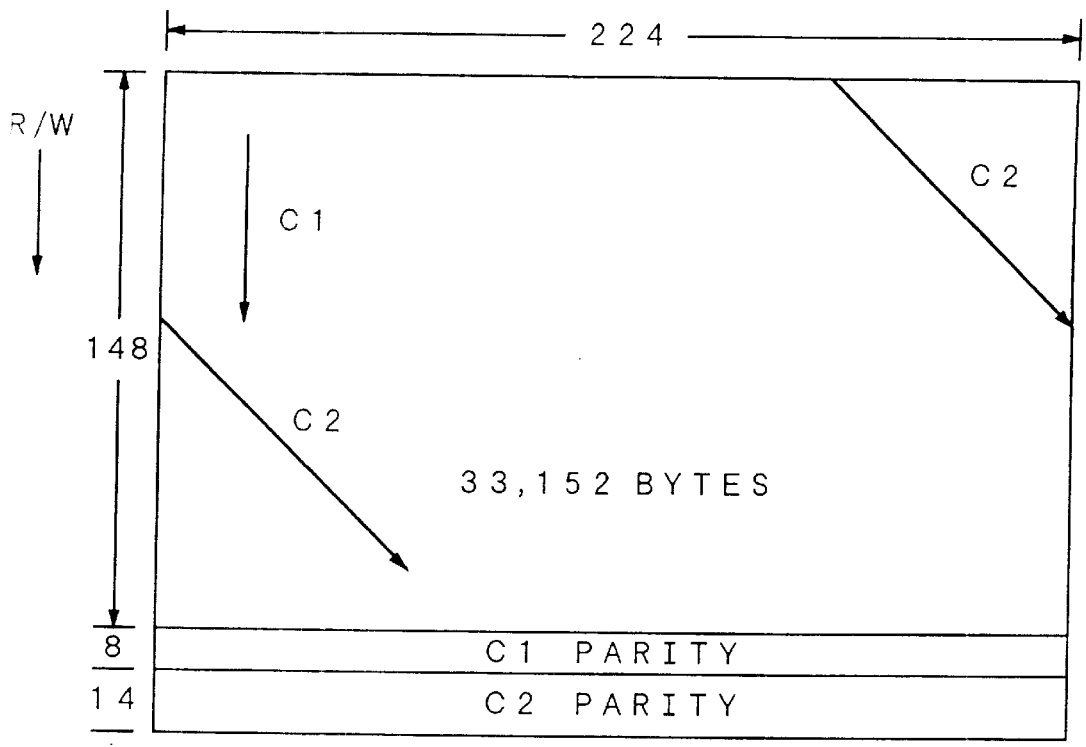
FIG. 29 is a schematic diagram showing the third embodiment in a data structure of a block.

As a data structure of one block in this case, as shown in FIG. 29, a 2-dimensional arrangement of (148×224=33,152 bytes) is specified. As an error correction code, a product code such that an encoding of the first error correction code (called a C1 code) is executed to 148 bytes in the longitudinal direction (each column), thereby forming the C1 parity of 8 bytes, and an encoding of the second error correction code (called a C2 code) is performed in the oblique direction (45° direction for the direction of the C1 code sequence), thereby adding the C2 parity of 14 bytes can be used.

Figure 30A:
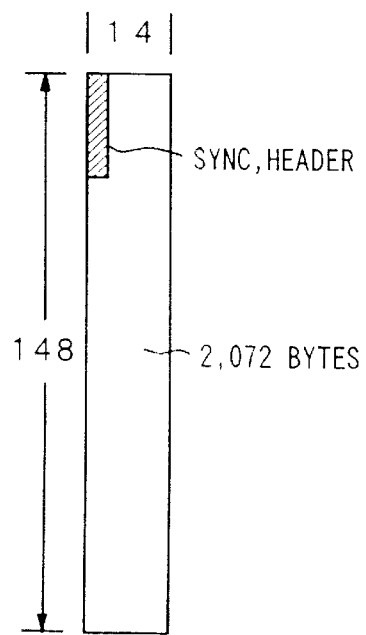
FIGS. 30A and 30B are schematic diagrams showing examples of two data structures of sectors in the block of FIG. 29.

A case of uniting the sectors of two different sizes to the block of the same size will now be more specifically described with reference to FIGS. 29 and 30. The process of the sector size in case of 2,072 bytes shown in FIG. 30A will now be described. In the block segmenting circuit 7, one sector is divided every 148 bytes in the R/W direction, thereby forming a 2-dimensional arrangement of (148×14= 2,072 bytes). Therefore, 16 sectors with such an arrangement are included in one block shown in FIG. 29 and a data structure in which one block consists of 16 sectors is formed.

Figure 30B:
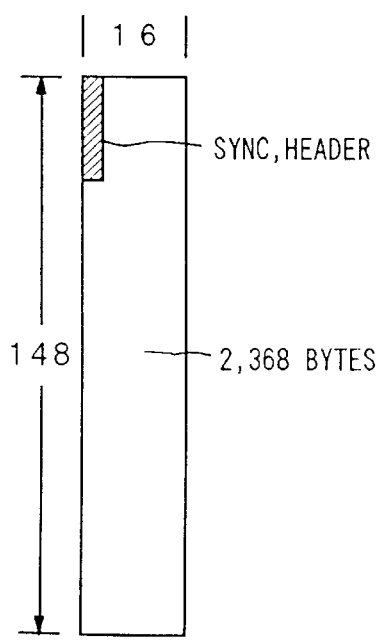

The process of the sector size in case of 2,368 bytes shown in FIG. 30B will now be described. The block segmenting circuit 7 divides one sector every 148 bytes in the R/W direction, thereby forming a 2-dimensional arrangement of (148×16=2,368 bytes). Therefore, 14 sectors with such an arrangement are included in one block shown in FIG. 29, thereby forming a data structure in which one block consists of 14 sectors.

Further, the fourth embodiment of the block data structure of the invention will now be described. According to the fourth embodiment of the invention, 24 bytes of a sector sync, a header, an error detection code EDC, and the like are added to the user data of 2,048 bytes of one sector. Therefore, a length of one sector is set to 2,072 bytes. On the other hand, 16 bytes of a sector sync, a header, an error detection code EDC, and the like are added to the user data of 2,352 bytes of one sector. Thus, a length of one sector is set to 2,368 bytes.

When a size to which the sector sync and header were added is considered as a sector size, since A'=2,072 and B'=2,368, n=8 and m=7 are selected. Further, when the block header of the same bit length, for example, 64 bytes is added to each of them, the block sizes are as follows.

64+2,072×8=16,640 bytes

64+2,368×7=16,640 bytes

The common same block size (16 kbytes) can be specified.

Figure 31:
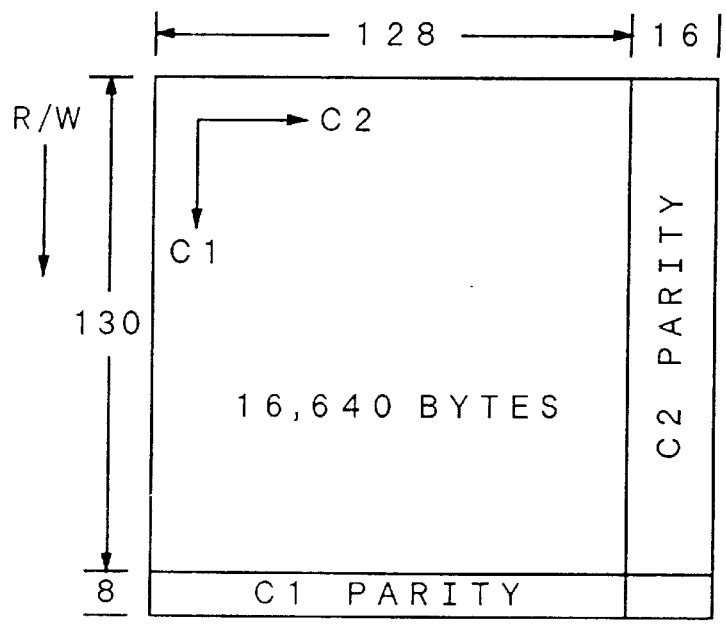
FIG. 31 is a schematic diagram showing the fourth embodiment in a data structure of the block.

As a data structure of one block in this case, as shown in FIG. 31, a 2-dimensional arrangement of (130×128=16,640 bytes) is specified. As an error correction code, a product code such that an encoding of the first error correction code (called a C1 code) is executed to 130 bytes in the vertical direction (each column), thereby forming the C1 parity of 8 bytes, and an encoding of the second error correction code (called a C2 code) is performed to 128 bytes in the lateral direction (each row), thereby adding the C2 parity of 16 bytes can be used. 64 bytes of the block header are added to, for example, the head of the block.

A case of uniting the sectors (2072 bytes and 2,368 bytes) of two different sizes to the block of the same size will now be more specifically described with reference to FIG. 31. A process of a sector size in case of 2,072 bytes will now be described. In a manner similar to the foregoing embodiment, the block segmenting circuit 7 divides one sector every 130 bytes in the R/W direction, thereby converting into a block structure. As shown in the above equations, eight sectors each composed of 2,072 bytes are included in the area excluding 64 bytes of the block header of one block.

The process of the sector size in case of 2,368 bytes will now be described. In a manner similar to the foregoing embodiment, the block segmenting circuit 7 divides one sector every 130 bytes in the R/W direction, thereby converting into a block structure. As shown in the above equations, seven sectors each composed of 2,368 bytes are included in the area excluding 64 bytes of the block header of one block.

Figure 32:
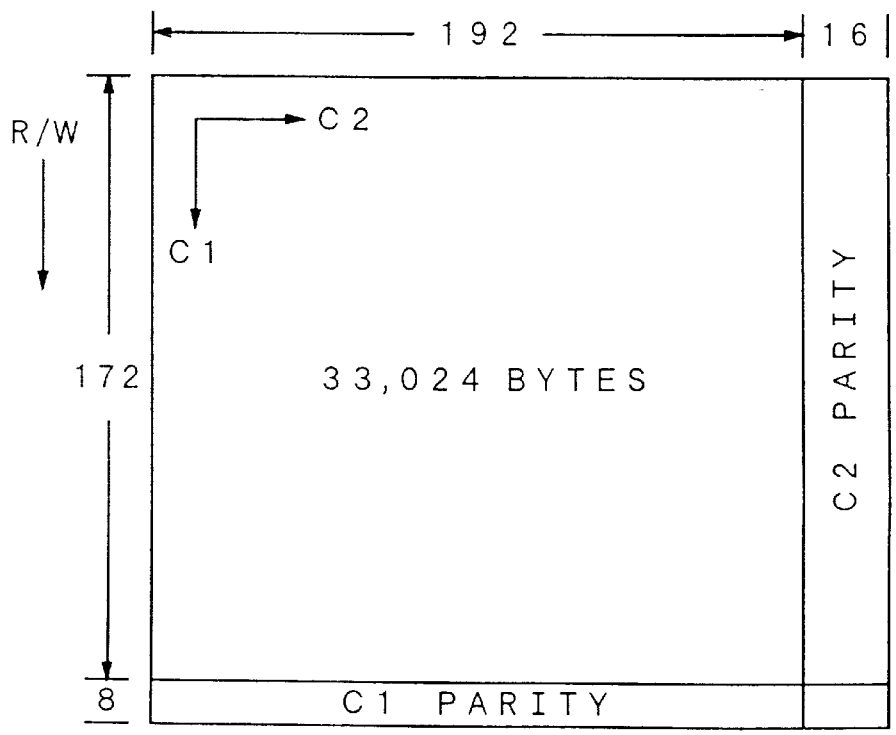
FIG. 32 is a schematic diagram showing the fifth embodiment in the data structure of the block.

FIG. 32 shows the fifth embodiment with a block data structure having the block header of the same data length according to the invention. In the fifth embodiment of the invention, 10 bytes of a sector sync, a header, an error detection code EDC, and the like are added to the user data of 2,048 bytes of one sector. Therefore, a length of one sector is set to 2,058 bytes. On the other hand, none of a sector sync, a header, an error detection code EDC, and the like is added to the user data of 2,352 bytes of one sector. Thus, a length of one sector is set to 2,352 bytes.

When a size to which the sector sync and header were added is considered as a sector size, since A'=2,058 and B'=2,352, n=16 and m=14 are selected. Further, when the block header of the same bit length, for example, 96 bytes is added to each of them, the block sizes are as follows.

96+2,058×16=33,024 bytes

96+2,352×14=33,024 bytes

The common same block size (32 kbytes) can be specified.

As a data structure of one block in this case, as shown in FIG. 32, a 2-dimensional arrangement of (172×192=33,024 bytes) is specified. As an error correction code, a product code such that an encoding of the first error correction code (called a C1 code) is executed to 172 bytes in the vertical direction (each column), thereby forming the C1 parity of 8 bytes, and an encoding of the second error correction code (called a C2 code) is performed to 192 bytes in the lateral direction (each row), thereby adding the C2 parity of 16 bytes can be used. 96 bytes of the block header are added to, for example, the head of the block.

In a manner similar to the foregoing embodiment, the block segmenting circuit 7 unites the sectors (2,058 bytes and 2,352 bytes) of two different sizes to the blocks of the same size. In this case, as shown in the above equations, 16 sectors each composed of 2,058 bytes are included in the area excluding 96 bytes of the block header of one block. In case of 2,352 bytes, as shown in the above equations, 14 sectors each composed of 2,352 bytes are included in the area excluding 96 bytes of the block header of one block.

The foregoing block sizes of 16 kbytes, 24 kbytes, and 32 kbytes are shown as an example. It will be obviously understood that other block sizes can be used in consideration of an application or the like. The invention is not limited to a disk-shaped recording medium but can be also applied to the case of using a semiconductor memory of a large capacity as a data recording medium.

The invention is not limited to one block but a plurality of blocks, for example, two blocks are set to one unit and the sectors of a plurality of sector sizes can be also united. For example, 21 CD sectors each composed of (2,352 bytes+6 bytes=2,358 bytes) are inserted to two (49,536 bytes) blocks each composed of 24 kbytes (24,768 bytes) mentioned above. Thus, the size is set to (2,358×21=49,518 bytes). By using 18 bytes (9 bytes per one block) as a block header, the CD sector can be united to the same block size.

In the above embodiment, the CD sectors have been inserted to the block in which an integer number of sectors each composed of 2 kbytes are included like computer data. However, on the contrary, it is also possible to construct the block of a size such that an integer number of CD sectors are included and to insert the sectors each composed of 2 kbytes. In this case as well, a fraction can be adjusted by the block header.

The block header is data having a meaning such as a block sync or the like and is ordinarily added to the head of the block. According to the invention, the invention is not limited to the block header but a space or a reserve region having a length similar to that described as a block header can be also provided after the block.

Further, in order to realize a larger capacity of the optical disc, a one-side multi-layer disc or a two-side multi-layer disc has been proposed. In case of a one-side double layer disc, the disc has two recording layers and data can be read from one side. On the other hand, data of a CD sector structure can be recorded to one recording layer and data of a structure of 2 kbytes can be recorded to the other recording layer. Even in case of the two-side disc, data of different sector structures can be also similarly separately recorded to the recording surfaces.

Although the embodiments have been described above with respect to the optical disc as an example, the invention can be also similarly applied to a hard disk, a flexible disk (FD), further, a semiconductor memory, and a tape-shaped recording medium.

According to the invention, another sector size can be inserted to the block of a predetermined size which is specified by a certain sector size. As mentioned above, since two formats can be united to the block of a predetermined size, a compatibility of data between a new disc medium and the existing disc medium can be improved. For example, data of the CD-ROM is recorded to the DVD and a reproducing process or a hardware can be simplified.

What is claimed is:

1. A data reproducing apparatus for reproducing a data recording medium in which data which was obtained by performing an error correction encoding and a digital modulation to digital data which had been segmented on the basis of predetermined units having two or more different sizes and by adding a sync signal to said data has been recorded, having a reproduction processing circuit to which the reproduced data is supplied, wherein said reproduction processing circuit comprises:

a sync signal separating circuit for separating said sync signal from the reproduced data;

demodulating circuit for demodulating the data which was subjected to the digital modulation;

a decoder for decoding the data which was subjected to the encoding for the error correction; and identifying means for identifying the size of said predetermined unit of the reproduced data by the sync signal separated by said sync signal separating circuit.

2. An apparatus according to claim 1, wherein said predetermined unit is a sector.

3. An apparatus according to claim 1, wherein said predetermined unit is a block comprising a plurality of sectors.

4. An apparatus according to claim 1, further comprising:

a block segmenting circuit for dividing the data which is supplied from said reproduction processing circuit into predetermined blocks;

a first sector desegmenting circuit for dividing said block into sectors having a first size;

a second sector desegmenting circuit for dividing said block into sectors having a second size; and switching means for selectively switching the data from said first and second sector desegmenting circuits in accordance with an ID signal that is outputted from said identifying means and for outputting the switched data.

5. An apparatus according to claim 1, wherein said first sector desegmenting circuit divides said block into the sectors according to a CD format and said second sector desegmenting circuit divides said block into sectors consisting of data of 2 kbytes.

6. An apparatus according to claim 1, wherein said identifying means identifies whether the digital modulated data is data which was CD formatted or not.

* * * * *